(12) United States Patent
Shirakawa

(10) Patent No.: US 9,116,961 B2
(45) Date of Patent: Aug. 25, 2015

(54) INFORMATION PROCESSING DEVICE, INFORMATION PROCESSING SYSTEM AND SEARCH METHOD

(75) Inventor: Shinichi Shirakawa, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 630 days.

(21) Appl. No.: 13/432,263

(22) Filed: Mar. 28, 2012

(65) Prior Publication Data

US 2012/0284572 A1 Nov. 8, 2012

(30) Foreign Application Priority Data

May 6, 2011 (JP) ................. 2011-103807

(51) Int. Cl.
*G06F 17/30* (2006.01)
*G06F 7/00* (2006.01)
*G06F 21/32* (2013.01)

(52) U.S. Cl.
CPC .... *G06F 17/30495* (2013.01); *G06F 17/30327* (2013.01); *G06F 21/32* (2013.01)

(58) Field of Classification Search
CPC .......................... G06F 21/32; G06Q 20/40145
See application file for complete search history.

(56) References Cited

U.S. PATENT DOCUMENTS

| | | | |
|---|---|---|---|
| 7,492,971 B2 | 2/2009 | Sakuma et al. | |
| 8,060,497 B1 * | 11/2011 | Zatsman et al. | 707/723 |
| 8,090,745 B2 | 1/2012 | Hayashi et al. | |
| 2007/0003112 A1 * | 1/2007 | Awatsu et al. | 382/115 |
| 2010/0027895 A1 | 2/2010 | Noguchi et al. | |
| 2010/0332475 A1 * | 12/2010 | Birdwell et al. | 707/737 |

FOREIGN PATENT DOCUMENTS

| | | |
|---|---|---|
| JP | 2004-046612 A | 2/2004 |
| JP | 2005-322161 A | 11/2005 |
| JP | 2007-073063 A | 3/2007 |
| JP | 2009-199151 | 9/2009 |
| JP | 2010-224903 | 10/2010 |
| WO | WO-2008/026414 A | 3/2008 |

OTHER PUBLICATIONS

"Standard Error of Measurement" by Leo M. Harvill, East Tennessee State University, Summer 1991.*

(Continued)

*Primary Examiner* — Sangwoo Ahn
(74) *Attorney, Agent, or Firm* — Fujitsu Patent Center

(57) ABSTRACT

An information processing device includes a memory unit that stores registration data of a search target and error information indicating an error of the registration data in association with each other. The information processing device includes a search unit that searches for registration data from the registration data stored by memory unit, the registration data searched by the search unit being registration data for which a value obtained by subtracting a value of the error information from a value of distance between query data related to a search request and the registration data is within the predetermined neighborhood range.

15 Claims, 19 Drawing Sheets

(56) References Cited

OTHER PUBLICATIONS

Benjamin Bustos et al., Pattern Recognition Letters 24 (2003); Pivot selection techniques for proximity searching in metric spaces; pp. 2357-2366.

H. V. Jagadish et al.;, ACM Transactions on Database Systems, vol. 30, No. 2, Jun. 2005; iDistance: An Adaptive $B^+$-Tree Based Indexing Method for Nearest Neighbor Search, pp. 364-397.

* cited by examiner

INFORMATION PROCESSING DEVICE, INFORMATION PROCESSING SYSTEM AND SEARCH METHOD

CROSS-REFERENCE TO RELATED APPLICATION

This application is based upon and claims the benefit of priority of the prior Japanese Patent Application No. 2011-103807, filed on May 6, 2011, the entire contents of which are incorporated herein by reference.

FIELD

The embodiments discussed herein are directed to an information processing device, an information processing system and a search method.

BACKGROUND

Conventionally, a technique is known of searching for data having a similarity or the degree of association with input query data meeting predetermined conditions, from a plurality of items of data registered in a database.

As an example of these techniques, a technique of neighborhood search is known of indicating a similarity or the degree of association between data as a distance in a multi-dimensional space, and selecting data having the distance to query data meeting predetermined conditions. For example, an information processing device which executes such neighborhood search calculates a distance between data registered in a database and input query data, and searches for data having the calculated distance in a predetermined range as neighborhood data of query data.

Meanwhile, when multiple items of data are registered in the database, if the information processing device executes linear search of calculating distances between all items of data registered in the database and input data, calculation cost for neighborhood search is high. Further, a technique is known of reducing calculation cost for executing neighborhood search by creating in advance an index based on data registered in a database, and limiting the number of items of data for which distances to query data are calculated.

For example, an information processing device which hierarchically adopts this technique divides a multi-dimensional space using a format such as KD (K Dimensional)-Tree, SR (Sphere/Rectangle)-Tree or R-Tree. Further, the information processing device limits the number of items of data for which distances to query data are calculated, by limiting the space of a neighborhood search target, and reduces calculation cost.

Further, a technique is known of pruning data which can be obviously excluded from neighborhood candidates of query data, by setting a reference point in the multi-dimensional space and calculating in advance the distance between the set reference point and each data registered in a database. For example, the information processing device which adopts this technique calculates in advance the distance between the reference point and each data registered in the database. Further, the information processing device calculates the distance between query data and the reference point when executing neighborhood search.

Further, the information processing device prunes data which can be obviously excluded from neighborhood candidates according to a triangular inequality, based on the distance between query data and the reference point and the distance between the reference point and each data. Hence, the information processing device limits the number of items of data for which distances to query data are calculated, and reduces calculation cost.

Further, a technique is known of generating a B+Tree index, using a distance between a reference point and data registered in a database as an index key. For example, an information processing device which adopts this technique generates an index key based on a distance from the reference point when registering data in the database, and registers data in the index together with the generated key. Further, the information processing device limits the number of items of data for which distances to query data and reduces calculation cost by searching for registration data having a key in a neighborhood range of query data as a neighborhood candidate, using an index when executing neighborhood search.

Further, a technique is known of increasing the speed of searching for data positioned in a neighborhood range of query data by tolerating an error in the neighborhood range of query data. An information processing device which adopts this technique reduces calculation cost for neighborhood search and increases the speed of neighborhood search by approximately searching for data positioned in the neighborhood of query data.

In some cases, the above information processing device which executes neighborhood search executes biometric authentication of, for example, acquiring biological data such as fingerprints and vein shapes as query data, and determining whether or not biological data of the same person as a person indicated by the acquired biological data is stored in a database. An information processing device which executes this biometric authentication limits the number of items of data which are targets of biological data matching processing which requires high calculation cost, and reduces calculation cost by narrowing down data which is similar to query data by neighborhood search.

Patent Document 1: Japanese Laid-open Patent Application No. 2009-199151
Patent Document 2: Japanese Laid-open Patent Application No. 2007-073063
Patent Document 3: Japanese Laid-open Patent Application No. 2004-046612
Patent Document 4: International Publication Pamphlet No. WO 2008/026414
Patent Document 5: Japanese Laid-open Patent Application No. 2005-322161
Patent Document 6: Japanese Laid-open Patent Application No. 2010-224903
Non-Patent Document 1: B. Bustos, G. Navarro, and E. Chaves: Pivot selection techniques for proximity searching in metric spaces, Pattern Recognition Letters, Vol. 24, No. 14, pp. 2357-2366 (2003)
Non-Patent Document 2: H. V. Jagadish, Beng Chin Ooi, Kian-Lee Tan, Cui Yu and Rui Zhang iDistance: An Adaptive B+-tree Based Indexing Method for Nearest Neighbor Search, ACM Transactions on Data Base Systems (ACM TODS), Vol. 30, No. 2, pp. 364-397 (2005)

However, the above techniques of performing neighborhood search are directed to performing neighborhood search of query data based only on a distance between each data registered in a database and query data, using registration data as one point in the multi-dimensional space. Hence, when there is a different error per data registered in the database, there is a problem that appropriate neighborhood search may not be performed.

For example, when biological data such as fingerprints and veins changes depending on a situation upon acquisition, and therefore, even with biological data of the same person, query data hardly matches completely with data registered in the database. Further, data registered in the database and query data have variations depending on individual differences or an environment in which biological data is acquired.

Hence, in some cases, when executing neighborhood search based only on a distance between data and query data using biological data of significant variation as query data, the information processing device causes search omission for data which needs to be included in a search result.

FIG. 22 is a view for describing conventional neighborhood search. For example, with an example illustrated in FIG. 22, an information processing device uses data included in a range of (B) in FIG. 22 from query data indicated by (A) in FIG. 22 as data in a neighborhood range. Meanwhile, even when (C) in FIG. 22 is data which needs to be included in a search result, if data has significant variation and input query data is far from the data indicated by (C) in FIG. 22, the information processing device causes search omission for data which needs to be included in the search result.

Further, FIG. 23 is a view for describing conventional neighborhood search. As illustrated in, for example, FIG. 23, when, as indicated by (B) in FIG. 23, setting a wide range which is a neighborhood of query data indicated by (A) in FIG. 23 to prevent search omission for data, too much data with little variation is included in a search result. As a result, the information processing device increases the number of items of data for which distances to query data are calculated, resulting in increasing calculation cost for neighborhood search.

SUMMARY

According to an aspect of an embodiment of the invention, an information processing device includes a memory unit that stores registration data of a search target and error information indicating an error of the registration data in association with each other. The information processing device includes a search unit that searches for registration data from the registration data stored by memory unit, the registration data searched by the search unit being registration data for which a value obtained by subtracting a value of the error information from a value of distance between query data related to a search request and the registration data is within the predetermined neighborhood range.

According to another aspect of an embodiment of the invention, an information processing device includes a memory unit that stores registration data which is a search target, a distance between the registration data and a reference point set in advance, and an inner product of the registration data and the reference point in association with each other. The information processing device includes a neighborhood candidate search unit that searches for registration data which meets the following conditions, (a) a value of a distance stored in the memory unit is larger than a value obtained by subtracting a value indicating a predetermined neighborhood range from a distance between the reference point and a query data of a search request, (b) the value of the distance stored in the memory unit is smaller than a value obtained by adding the value indicating the neighborhood range to the distance between the reference point and the query data. The information processing device includes a first extracting unit that extracts registration data from the registration data found as a result of search by the neighborhood candidate search unit, the registration data extracted by the first extracting unit being registration data for which a difference between the distance between the query data and the reference point and the distance between the registration data and the reference point is within the neighborhood range. The information processing device includes a second extracting unit that extracts registration data from the registration data extracted by the first extracting unit, the registration data extracted by the second extracting unit being registration data for which an inner product stored in the memory unit is within a predetermined range with respect to an inner product of the reference point and any vector within the neighborhood range of the query data. The information processing device includes a neighborhood data determining unit that determines neighborhood data of the query data from the registration data extracted by the second extracting unit, the neighborhood data of the query data being registration data for which the distance to the query data is within the neighborhood range.

According to still another aspect of an embodiment of the invention, an information processing device includes a first selecting unit that selects a criterion reference point from a plurality of criterion reference points set in advance, the criterion regerence point selected by the first selecting unit is closest to registration data of a search target. The information processing device includes a second selecting unit that selects an auxiliary reference point from a plurality of auxiliary reference points set in advance, the auxiliary regerence point selected by the second selecting unit is within a predetermined neighborhood range of the registration data. The information processing device includes a memory unit that stores the registration data, a value of distance between the registration data and the criterion reference point selected by the first selecting unit, and a value of distance between the registration data and the auxiliary reference point selected by the second selecting unit. The information processing device includes a third selecting unit that selects an auxiliary reference point within the neighborhood range of query data of a search request. The information processing device includes a neighborhood candidate search unit that searches for registration data which meet the following conditions, (a) a value of the distance stored in the memory unit is larger than a value obtained by subtracting a value of the neighborhood range from a value of distance between the query data and the criterion reference point, (b) the value of the distance stored in the memory unit is smaller than a value obtained by adding the value of the neighborhood range to the value of distance between the query data and the criterion reference point. The information processing device includes a extracting unit that extracts registration data from the registration data found as a result of search by neighborhood candidate search unit, the registration data extracted by the extracting unit being registration data for which a difference is within a value of the neighborhood range, the difference is a difference between the value of distance between the auxiliary reference point and the query data, and a value of distance between the auxiliary reference point and the registration data. The information processing device includes a neighborhood data determining unit that determines neighborhood data of the query data from the registration data extracted by the extracting unit, the neighborhood data of the query data being registration data for which the distance to the query data is within the neighborhood range.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings.

[a] First Embodiment

Figure 1:
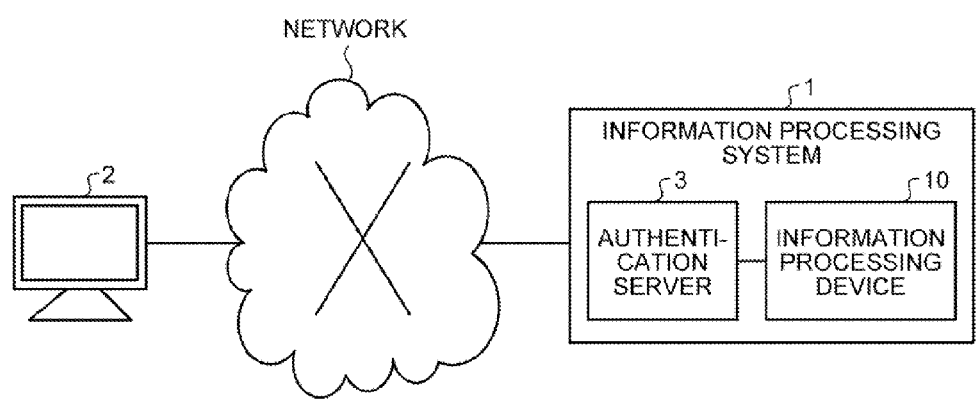
FIG. 1 is a view for describing an information processing system according to a first embodiment.

With the following first embodiment, the information processing system which authenticates users based on biological data input by the users will be described. FIG. 1 is a view for describing an information processing system according to the first embodiment. With an example illustrated in FIG. 1, an information processing system 1 has an authentication server 3 and an information processing device 10. Further, the information processing system 1 is connected with a client device 2 which acquires biological data of a user, through a network.

The information processing system 1 executes biometric authentication which is referred to as "1:N authentication" of determining whether or not there is biological data of the same person as biological data acquired from the user. The information processing system 1 acquires biological data acquired from the user, from the client device 2 through the network. Hence, the client device 2 acquires image data of a finger print and veins and biological data such as an iris as biological data of the user, encrypts the acquired biological data, and transmits the encrypted biological data to the information processing system 1 through the network.

The information processing device 10 included in the information processing system 1 has a database which stores biological data, and searches for data similar to decrypted biological data, from the database. In this case, the information processing device 10 efficiently searches for similar data, using a neighborhood search technique. Then, the authentication server 3 matches data searched by the information processing device 10, and biological data acquired by the client device 2, and authenticates a user. Then, the information processing system 1 encrypts an authentication result of the user, and transmits the encrypted authentication result to the client device 2 through the network.

Meanwhile, as a biological data matching method executed by the authentication server 3, a method of using various feature amounts for authenticating fingerprints and veins is known. For example, the authentication server 3 can adopt a method of using, for example, a direction, a length or an inclination of a ridge in a small area in a biological data image, or a density, a coordinate and a frequency component of a characteristic point of an end or a branch of the ridge disclosed in Japanese Patent No. 2815045, Japanese Laid-open Patent Application No. 2006-277407, and Japanese Laid-open Patent Application No. 2007-249339. Further, the authentication server 3 can use a numerical value which represents these features in the biological data image and is converted into a vector as a feature amount vector.

Figure 2:
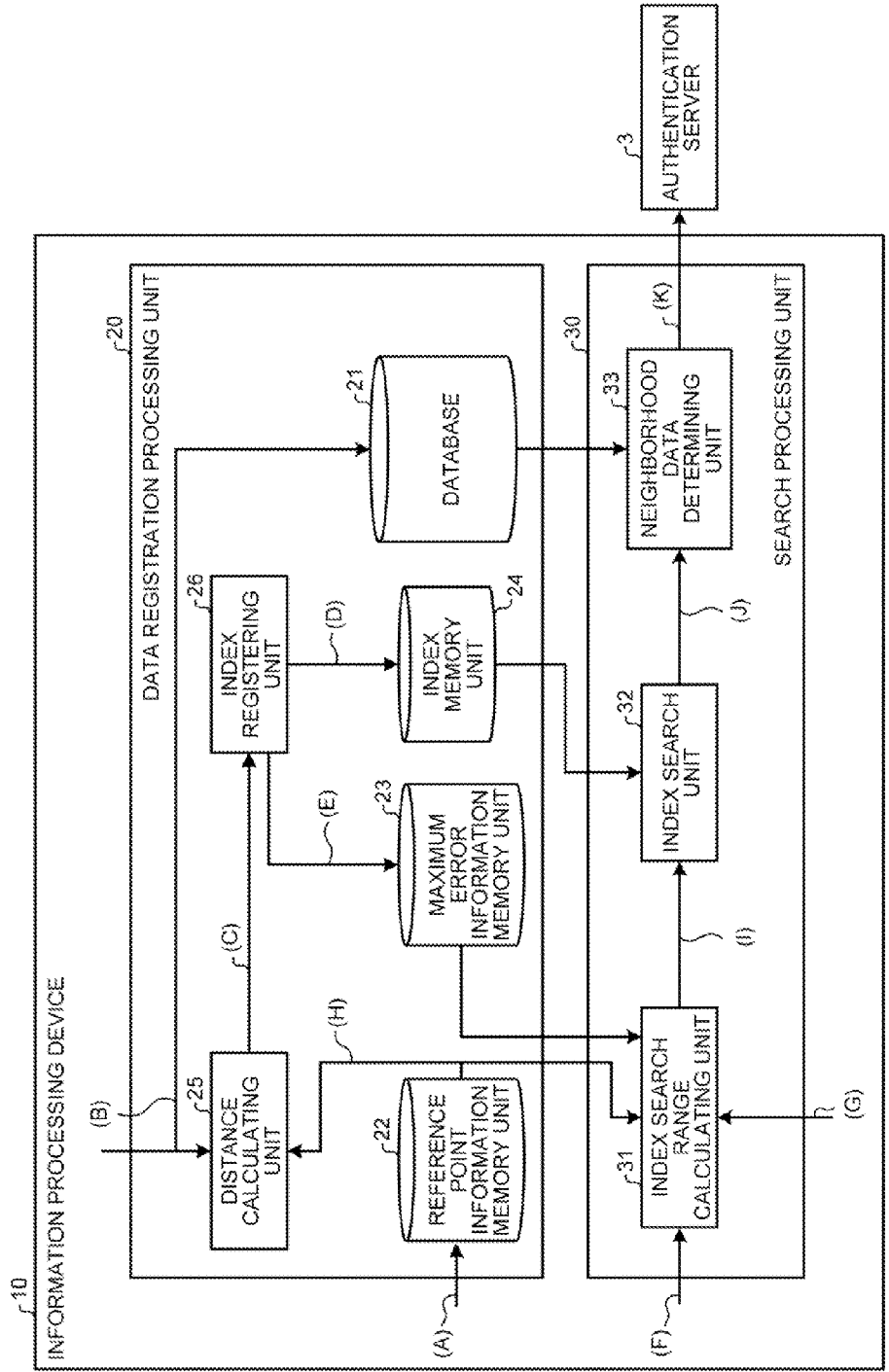
FIG. 2 is a view for describing an information processing device according to the first embodiment.

Next, the information processing device 10 will be described using FIG. 2. FIG. 2 is a view for describing the information processing device according to the first embodiment. With an example illustrated in FIG. 2, the information processing device 10 has a data registration processing unit 20 and a search processing unit 30. The data registration processing unit 20 has a database 21, a reference point information memory unit 22, a maximum error information memory unit 23, an index memory unit 24, a distance calculating unit 25 and an index registering unit 26. Further, the search processing unit 30 has an index search range calculating unit 31, an index search unit 32 and a neighborhood data determining unit 33.

The database 21 stores registration data which is biological data of a user. Further, the database 21 stores an error parameter indicating an error of each registration data per registration data.

Hereinafter, processing of registering biological data and error parameters in the database 21 will be described using an example where biological data of a new user is newly registered. For example, the new user inputs a plurality of items of biological data acquired in the same period, to the information processing device 10 as data to be newly registered.

The information processing device 10 calculates a feature amount vector indicating a feature of the input biological data and an error parameter, using a statistical amount such as an average or a dispersion of the feature amount obtained from a plurality of input biological data. Then, as indicated by (B) in FIG. 2, the information processing device 10 stores the calculated feature amount vector in the database 21 as registration data. Further, the information processing device 10 associates and stores the calculated error parameter with the calculated feature amount vector, that is, registration data, in the database 21.

Meanwhile, the error parameter represents the degree of variation of each data, and is given upon registration of data. For example, in case of a biometric authentication system, biological data is generally collected a plurality of times upon registration of biological data, so that it is possible to obtain a feature amount vector or an error parameter, using the statistical amount such as an average or a dispersion of the feature amount obtained from a plurality of items of biological data. Further, the error parameter may be set based on quality of biological data which can be estimated based on the accuracy or disposition conditions of a device upon collection of registration data. Further, with biological data, biological data which is acquired as query data is also likely to change when a long time passes after data registration, and therefore an error parameter may be changed according to the time since registration.

The reference point information memory unit 22 stores information indicating the position of a reference point. For example, when receiving information indicating positions of a plurality of reference points $o_1$ to $o_M$ in a multi-dimensional space set in advance as indicated by (A) in FIG. 2, the reference point information memory unit 22 stores the received information indicating the positions of the reference points.

Meanwhile, the database 21 stores a feature amount vector indicating the feature amount of biological data as registration data. Hence, the reference point information memory unit 22 stores as reference point information an arbitrary vector having the same number of dimensions as the number dimensions of the feature amount vector adopted by the database 21.

The maximum error information memory unit 23 associates and stores an error parameter having the greatest value among error parameters of registration data associated with each reference point, and a reference point. Further, the maximum error information memory unit 23 associates and stores registration data positioned the farthest from the reference point among registration data associated with the reference points, and each reference point.

For example, a plurality of items of registration data $p_1$ to $p_x$ are associated with reference points $o_i$, error parameters of registration data $p_1$ to $p_x$ are $\epsilon_1$ to $\epsilon_x$, and an error parameter having the greatest value among the error parameters $\epsilon_1$ to $\epsilon_x$ is $\epsilon_i^{max}$. Further, the distance to registration data positioned farthest from the reference point $o_i$ among the registration data $p_1$ to $p_x$ is $r_i^{max}$. In this case, the maximum error information memory unit 23 associates and stores $o_i$, $\epsilon_i^{max}$ and $r_i^{max}$. In the following description, a reference point associated with each registration data is a corresponding reference point.

The index memory unit 24 stores an index which the search processing unit 30 utilizes to search for data which is a neighborhood candidate of query data from the database 21. More specifically, the index memory unit 24 associates and stores per reference point a key value calculated by the index registering unit 26 which will be described below, registration data corresponding to the key value and an error parameter of the registration data.

Figure 3:
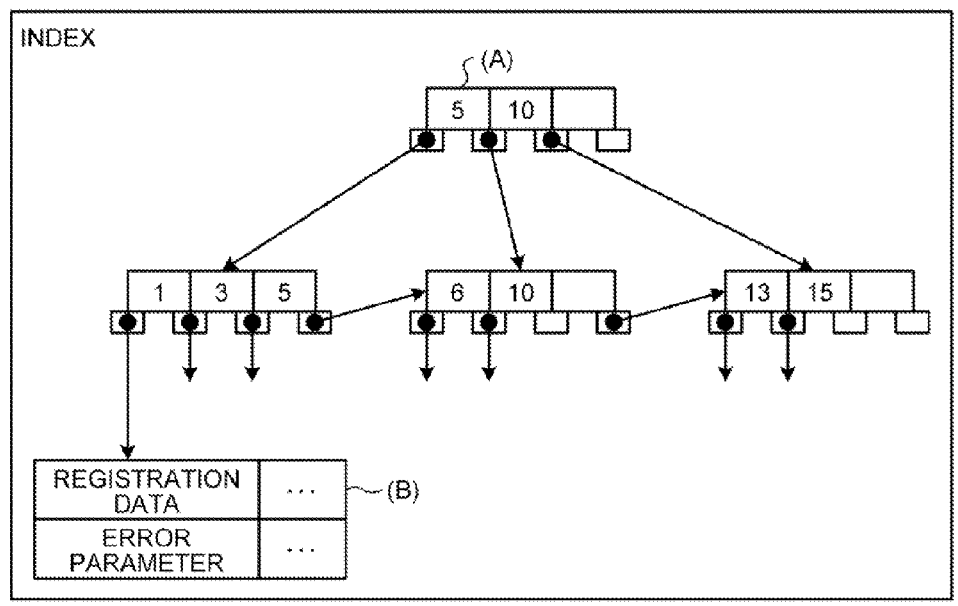
FIG. 3 is a view for describing an example of an index according to the first embodiment.

Hereinafter, the index stored in the index memory unit 24 will be described using FIG. 3. FIG. 3 is a view for describing an example of an index according to the first embodiment. As illustrated in FIG. 3, an index is a tree type, and, as indicated by (A) in FIG. 3, hierarchically has a key value calculated by the index registering unit 26. Further, as indicated by (B) in FIG. 3, the index is associated with a corresponding key value, and has registration data and an error parameter of the registration data. That is, the index hierarchically has a key value calculated per registration data by the index registering unit 26, and stores registration data and an error parameter as data corresponding to each key value.

Back to FIG. 2, the distance calculating unit 25 calculates the distance between the input registration data and the reference point, and reports the calculated distance to the index registering unit 26. More specifically, as indicated by (B) in FIG. 2, the distance calculating unit 25 calculates the distance between registration data and each reference point stored in the reference point information memory unit 22 when registration data is stored in the database 21.

Further, as indicated by (C) in FIG. 2, the distance calculating unit 25 reports the closest distance among the calculated distances, that is, the distance between the corresponding reference point and registration data, to the index registering unit 26. Furthermore, the distance calculating unit 25 reports the corresponding reference point, the registration data and the error parameter of the registration data, to the index registering unit 26.

The index registering unit 26 generates a key value in a different range per corresponding reference point, based on the distance calculated by the distance calculating unit 25. Further, as indicated by (D) in FIG. 2, the index registering unit 26 adds the registration data and the error parameter of the registration data as data corresponding to the generated key value, to the index stored in the index memory unit 24.

Further, as indicated by (E) in FIG. 2, the index registering unit 26 associates and stores an error parameter having the greatest value among error parameters of registration data associated with corresponding reference points, in the maximum error information memory unit 23. Furthermore, the index registering unit 26 associates and stores the distance having the greatest value among distances of each registration data associated with corresponding reference points, in the maximum error information memory unit 23.

As described above, the data registration processing unit 20 stores registration data and error parameters. Further, when storing registration data and error parameters, the data registration processing unit 20 calculates a distance between a corresponding reference point and registration data, and creates an index using a value of the calculated distance as a key value. Further, the data registration processing unit 20 stores per corresponding reference point the greatest value of the error parameter among error parameters of registration data associated with corresponding reference points, and the greatest value of the distance among distances to the registration data associated with the corresponding reference points.

Next, each unit of the search processing unit 30 will be described. When acquiring biological data to authenticate, that is, query data, the index search range calculating unit 31 calculates the key range of data to search for as neighborhood candidates of the acquired query data, taking an error parameter into account. Further, the index search range calculating unit 31 reports the calculated key range to the index search unit 32.

For example, the index search range calculating unit 31 acquires query data as indicated by (F) in FIG. 2. Further, as indicated by (G) in FIG. 2, the index search range calculating unit 31 acquires information indicating a neighborhood range which is regarded as neighborhood data, that is, a radius of a multi-dimensional sphere around query data in the multi-dimensional space.

In this case, the index search range calculating unit 31 calculates the distance between each reference point and query data, using the function of the distance calculating unit 25. Further, the index search range calculating unit 31 acquires the maximum value of the error parameter stored in association with each reference point, and the maximum value of the distance to registration data, from the maximum error information memory unit 23.

Further, the index search range calculating unit 31 determines for each reference point whether or not a value obtained by subtracting the neighborhood range from each calculated distance is smaller than a sum of the maximum value of the error parameter stored in association and the maximum value of the distance. Further, the index search range calculating unit 31 executes the following processing for a reference point for which the value obtained by subtracting the neighborhood range from each calculated distance is determined to be smaller than the sum of the maximum value of the error parameter stored in association and the maximum value of the distance.

That is, the index search range calculating unit 31 calculates a key value range of registration data which is a neighborhood candidate of query data, using the distance between a reference point and query data, information indicating the neighborhood range and the maximum value of the error parameter stored in association with the reference point. Further, the index search range calculating unit 31 reports the calculated key value range, to the index search unit 32 as indicated by (I) in FIG. 2.

The index search unit 32 performs index search, and determines data included in the key value range calculated by the index search range calculating unit 31, that is, data which is a neighborhood candidate of query data. Further, the index search unit 32 reports data which is a determined neighborhood candidate of query data, to the neighborhood data determining unit 33.

For example, when acquiring the key value range from the index search range calculating unit 31, the index search unit 32 searches for registration data included in the acquired key value range, from the index. Furthermore, as indicated by (J) in FIG. 2, the index search unit 32 reports the determined registration data to the neighborhood data determining unit 33.

The neighborhood data determining unit 33 determines for each registration data which is a neighborhood candidate of query data, whether or not a value obtained by subtracting an error parameter from the distance between the query data and the registration data is included in the neighborhood range. Further, the neighborhood data determining unit 33 reports the data for which the value obtained by subtracting the error parameter from the distance between the query data and the registration data is included in the neighborhood range, as neighborhood data to the authentication server 3.

For example, the neighborhood data determining unit 33 receives a report of registration data which is a neighborhood candidate of query data which the index search unit 32 searched from the index stored in the index memory unit 24. In this case, the neighborhood data determining unit 33 determines for each reported registration data whether or not a value obtained by subtracting an error parameter from the distance between the query data and the registration data is smaller than a value in the neighborhood range. That is, the neighborhood data determining unit 33 determines whether or not the range indicated by each registration data and the error parameter overlaps the neighborhood range of the query data.

Further, when determining that the value obtained by subtracting the value of the error parameter from the distance between query data and registration data is smaller than the value in the neighborhood range, the neighborhood data determining unit 33 determines that the reported registration data is neighborhood data of query data. Then, the neighborhood data determining unit 33 transmits each registration data which is determined as neighborhood data of query data, to the authentication server 3 as indicated by (K) in FIG. 2.

As described above, when acquiring query data and the neighborhood range, the search processing unit 30 searches for registration data which is a neighborhood candidate of query data, taking the maximum value of the error parameter into account. Further, the search processing unit 30 determines for each searched registration data whether or not a range indicated by each registration data and the error parameter overlaps the neighborhood range of query data, and determines registration data which is determined to overlap the neighborhood range, as neighborhood data of query data.

Hence, even when the error parameter of each registration has variation, the search processing unit 30 can perform neighborhood search without search omission. That is, the search processing unit 30 widens a range in which registration data is determined to be neighborhood data of query data, for registration data of a great error parameter, and narrows a range in which registration data is determined to be neighborhood data of query data, for registration data of a small error parameter. Consequently, the search processing unit 30 can prevent search omission, and exclude unnecessary registration data from neighborhood data as much as possible. As a result, the search processing unit 30 can perform appropriate neighborhood search.

Further, the search processing unit 30 limits the number of items of registration data which are determined to be neighborhood data or not, using an index before the items of the registration data are determined to be neighborhood data or not. Consequently, the search processing unit 30 minimizes processing of calculating the distance between query data and registration data, reduce calculation cost and perform neighborhood search at a high speed.

For example, the distance calculating unit 25, the index registering unit 26, the index search range calculating unit 31, the index search unit 32, and the neighborhood data determining unit 33 are electronic circuits. Meanwhile, examples of electronic circuits include integrated circuits such as ASIC (Application Specific Integrated Circuit) and FPGA (Field Programmable Gate Array), or CPU (Central Processing Unit) and MPU (Micro Processing Unit).

Further, the database 21, the reference point information memory unit 22, the maximum error information memory unit 23 and the index memory unit 24 are semiconductor memory elements such as RAMs (Random Access Memory), ROMs (Read Only Memory) and flash memories, or storage devices such as hard disks or optical disks.

Next, specific examples of processing executed by the information processing device 10 will be described using FIGS. 4 to 6 and mathematical expressions. In addition, in the following description, registration target data is "p", an error parameter related to registration target data is "ε", each reference point is "$o_1$ to $o_m$", and the number of reference points is "M". Further, the distance function for calculating the distance between data X and data Y in the multi-dimensional space is "d(X,Y)".

First, processing of storing new data in the database 21 as registration data will be described. First, the information processing device 10 calculates the distance between each reference point and registration target data, using the distance function, and selects a reference point having the closest distance to data p to be registered, as a corresponding reference point $o_j$. Next, the information processing device calculates a key value K(p) of registration target data, using the following equation (1) and the selected $o_j$.

$$K(p)=d(o_j,p)+j\times C \qquad (1)$$

Meanwhile, C in equation is a constant. When C is sufficiently large, a key value of registration data corresponding to the reference point $o_j$ settles in a range of $[j \times C, (j+1) \times C)$. In addition, $[j \times C, (j+1) \times C)$ is the range equal to or more than "$j \times C$" and less than "$(j+1) \times C$". That is, the information processing device 10 calculates for each registration data a key value of a different range per corresponding reference point. For example, in case of "C=1000", the information processing device 10 can settle in a key value range of registration data corresponding to the reference point $o_1$, in the range of [1000,2000].

Next, the information processing device 10 adds the registration target data p and the error parameter $\epsilon$ to the index stored in the index memory unit 24 and the database 21, using the calculated value of K(p) as a key. Meanwhile, although a data structure of the index stored in the index memory unit 24 can adopt an arbitrary structure as long as this structure allows range search, it is possible to adopt a data structure such as B+-Tree or B-Tree.

Further, the information processing device 10 associates a maximum distance $r_j^{max}$ between registration data corresponding to the reference point $o_j$ and the reference point $o_j$, and $o_j$ in the maximum error information memory unit 23. Further, an error parameter having the greatest value among error parameters of registration data corresponding to the reference point $o_j$ is stored in the maximum error information memory unit 23 as $\epsilon_j^{max}$. Further, every time the registration data p is stored in the database 21, the information processing device 10 determines whether or not $r_j^{max}$ or $\epsilon_j^{max}$ is updated, and, upon updating, updates $r_j^{max}$ or $\epsilon_j^{max}$ to a new value.

Next, processing of searching for neighborhood data in the information processing device 10 will be described according to input query data and information indicating the neighborhood range. In the following description, input query data is "q", and information indicating the neighborhood range is "U". First, the information processing device 10 determines whether or not all reference points $o_i$ (i=1, 2 . . . and M) satisfy the following equation (2), and, when it is determined that the following equation (2) is satisfied, determines that registration data associated with each reference point is a neighborhood candidate of query data.

$$d(o_i, q) - U < r_i^{max} + \epsilon_i^{max} \quad (2)$$

Next, for the reference points $o_i$ satisfying equation (2), the information processing device 10 searches for registration data having a key value which takes an error parameter into account, in a range indicated by equation (3) from the index created in advance.

$$[d(o_i, q) + i \times C - U - \epsilon_i^{max}, d(o_i, q) + i \times C + U + \epsilon_i^{max}] \quad (3)$$

That is, the information processing device 10 searches for data which is a neighborhood candidate of query data by searching for the index in a range satisfying equation (3), utilizing the index. Consequently, the information processing device 10 can search for data which is a neighborhood candidate of query data at a high speed.

Figure 4:
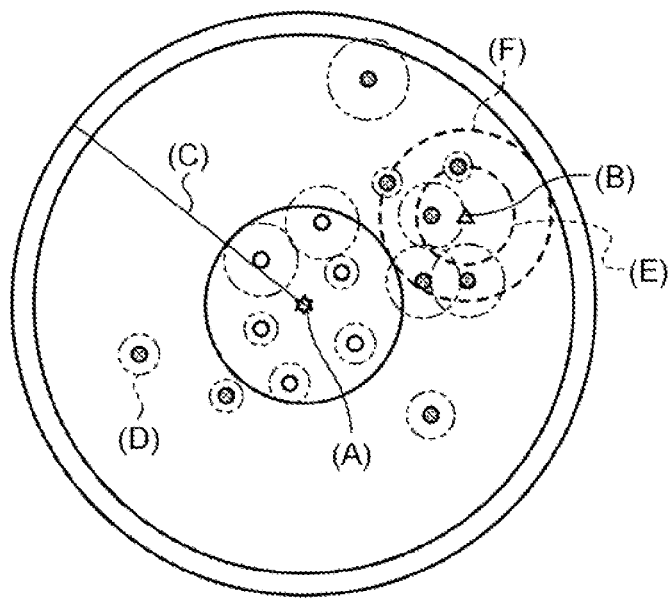
FIG. 4 is a view for describing an example of index search.

Meanwhile, FIG. 4 is a view for describing an example of index search. (A) in FIG. 4 is the reference point $o_i$, and (B) in FIG. 4 is query data. Further, (C) in FIG. 4 is the range of the reference points $o_i$ to $r_i^{max} + \epsilon_i^{max}$. Further, (D) in FIG. 4 is an error range indicated by an error parameter of registration data. Furthermore, (E) in FIG. 4 is a neighborhood range indicated by input U, and (F) in FIG. 4 is a range of query data to $U + \epsilon_i^{max}$. The information processing device 10 registers a value calculated from the distance between the reference point and registration data in the index as a key. Hence, registration data satisfying equation (3), that is, registration data which is a neighborhood candidate, is included in a donut-shaped shaded range illustrated in FIG. 4.

Next, the information processing device 10 actually calculates the distance between registration data of a neighborhood candidate which is acquired by index search, and query data, and determines whether or not a value obtained by subtracting the distance corresponding to the error parameter from the calculated distance is included in the neighborhood range. That is, the information processing device 10 determines whether or not the distance between each registration data of a neighborhood candidate and query data satisfies the following equation (4). In addition, "v" in equation (4) is neighborhood candidate data acquired by index search, and "$\epsilon_v$" is an error parameter of neighborhood candidate data.

$$d(q, v) - \epsilon_v < U \quad (4)$$

Figure 5:
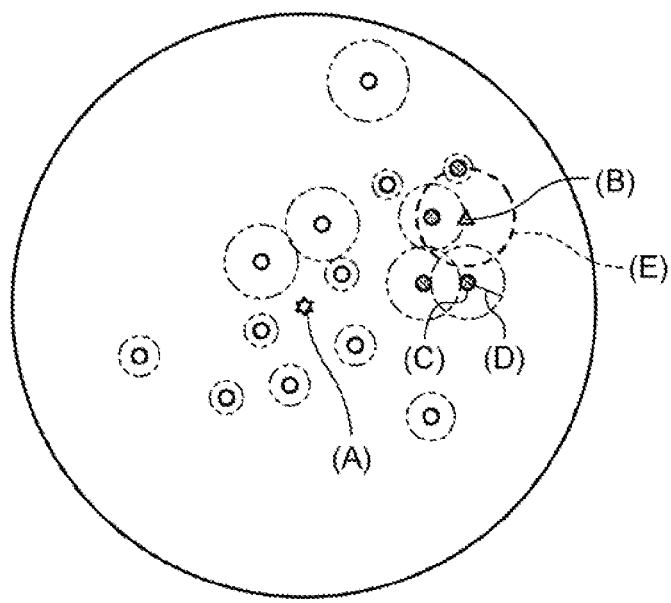
FIG. 5 is a view for describing an example of index search.

Then, when determining that neighborhood candidate data satisfying equation (4) is neighborhood data, the information processing device 10 transmits registration data indicated by shaded circles in FIG. 5, to the authentication server 3. In addition, FIG. 5 is a view for describing an example of index search. (A) in FIG. 5 is a reference point $o_i$, and (B) in FIG. 5 is query data. Further, (C) in FIG. 5 is registration data satisfying equation (4), and (D) in FIG. 5 is a range of an error indicated by an error parameter of registration data indicated by (C) in FIG. 5. Further, (E) in FIG. 5 is a neighborhood range indicated by input U.

Next, a search result of neighborhood data by the information processing device 10 will be described in details using FIG. 6. FIG. 6 is a view for describing an example of a search processing result according to the first embodiment. (A) in FIG. 6 is a reference point, and (B) in FIG. 6 is a neighborhood range. Further, shaded circles in FIG. 6 are registration data searched as neighborhood data.

Figure 6:
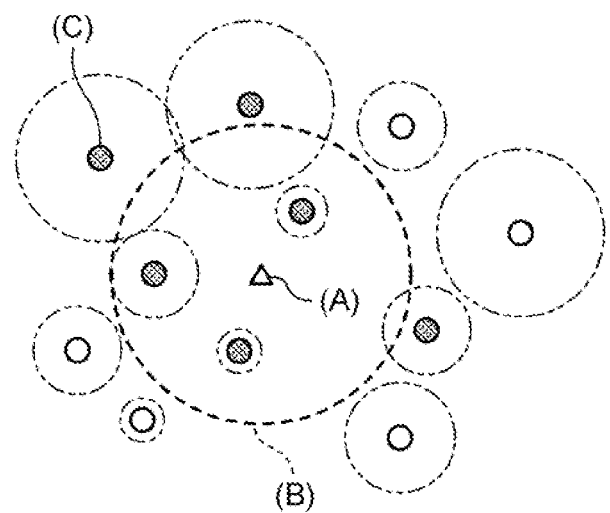
FIG. 6 is a view for describing an example of a search processing result according to the first embodiment.

When registration data satisfying equation (4) is neighborhood data, even if registration data is not included in the neighborhood range, the information processing device 10 determines that registration data having the range which is indicated by the error parameter and which overlaps the neighborhood range is neighborhood data as indicated by (C) in FIG. 6. Consequently, the information processing device 10 can include registration data of a significant error which is conventionally missed in neighborhood data as indicated by (C) in FIG. 6.

Figure 7:
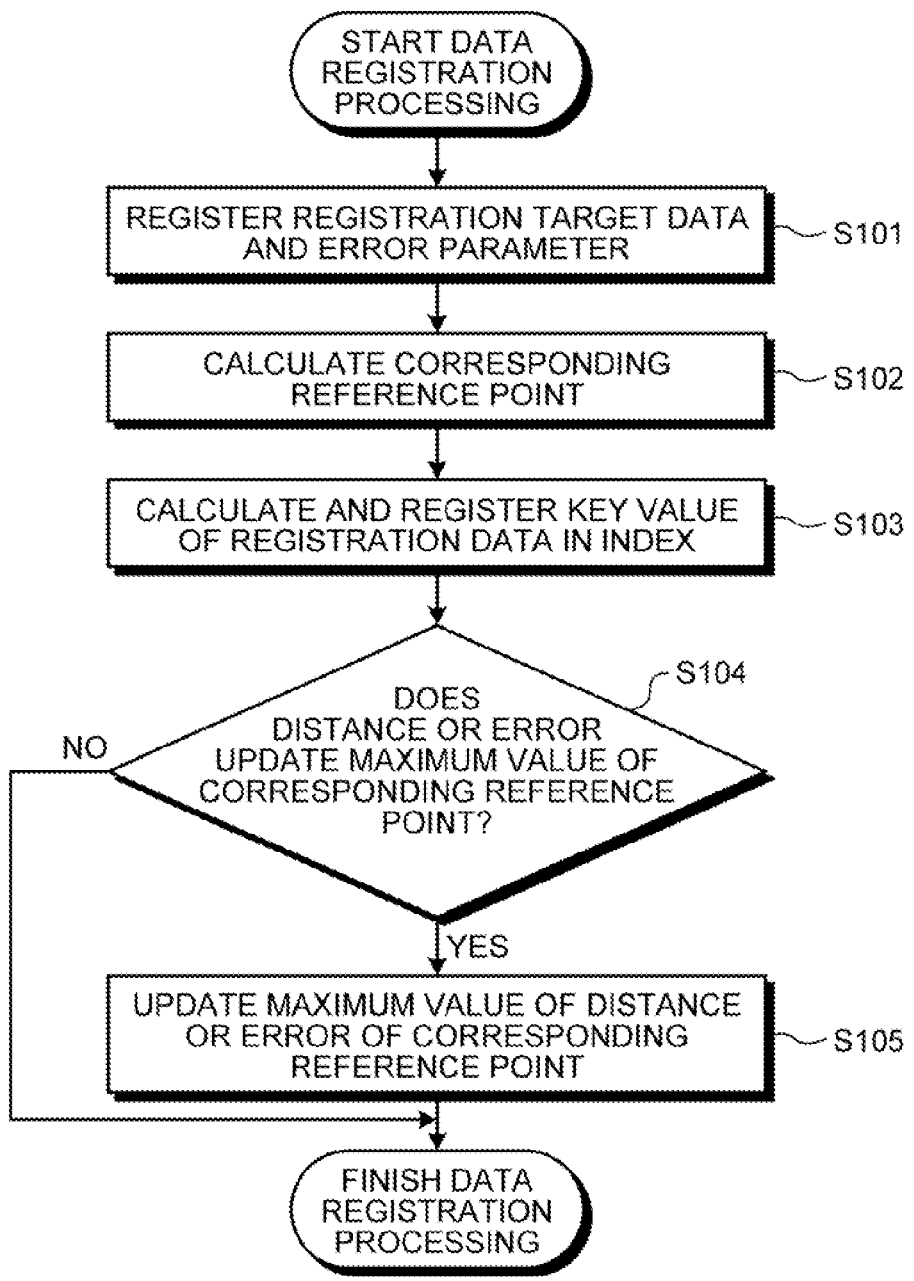
FIG. 7 is a flowchart for describing an example of a flow of registration processing according to the first embodiment.

Next, an example of a flow of processing of registering new data by the information processing device 10 will be described using FIG. 7. FIG. 7 is a flowchart for describing an example of a flow of registration processing according to the first embodiment. With the example illustrated in FIG. 7, the information processing device 10 starts processing when triggered by reception of data to be newly registered in the database 21 and an error parameter.

First, the information processing device 10 stores registration target data to be newly registered and the error parameter in the database 21 (step S101). Next, the information processing device 10 calculates a corresponding reference point of registration target data (step S102). Next, the information processing device 10 calculates a key value of registration data based on the distance between the calculated corresponding reference point and registration data, and registers the calculated key value, the registration target data and the error parameter in the index stored in the index memory unit 24 (step S103).

Next, the information processing device 10 determines whether or not the calculated distance or the acquired error parameter updates the maximum value of the distance associated with the corresponding reference point or the maximum value of the error parameter (step S104). Further, the information processing device 10 executes the following processing when determining that the maximum value of the distance associated with the corresponding reference point and the maximum value of the error parameter is updated (Yes in step S104).

That is, the information processing device 10 updates the maximum value of the distance associated with the corresponding reference point or the maximum value of the error parameter (step S105), and finishes registration processing. By contrast with this, the information processing device 10 finishes registration processing as is when determining that the maximum value of the distance associated with the corresponding reference point and the maximum value of the error parameter (No in step S104).

Figure 8:
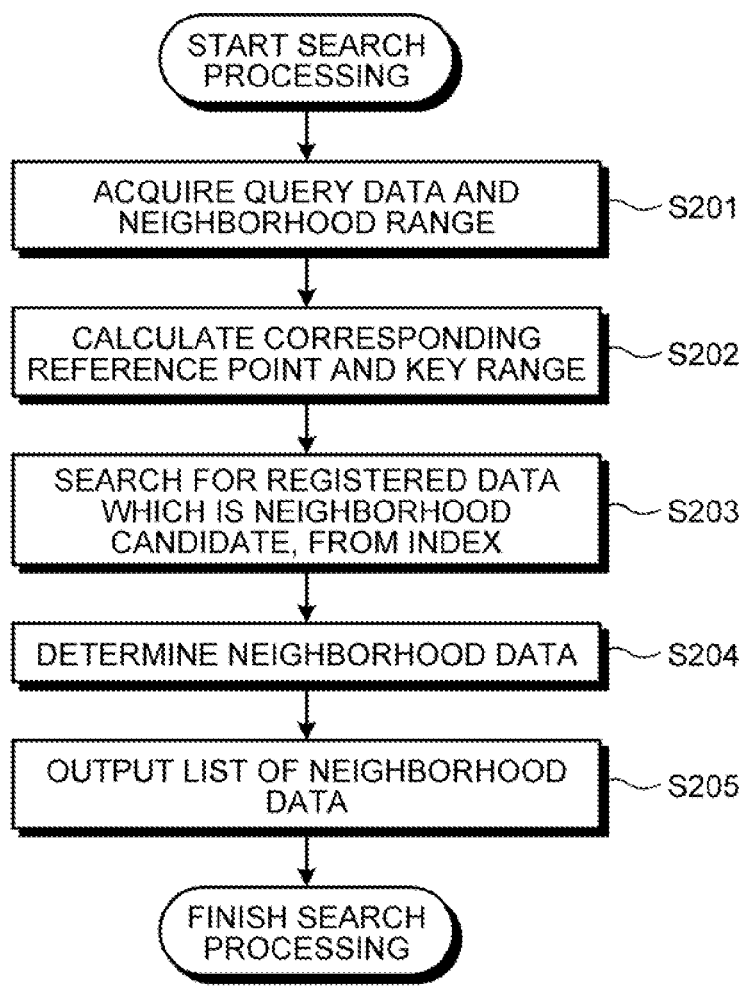
FIG. 8 is a flowchart for describing an example of a flow of search processing according to the first embodiment.

Next, an example of a flow of processing of searching for neighborhood data of input query data by the information processing device 10 will be described using FIG. 8. FIG. 8 is a flowchart for describing an example of a flow of search processing according to the first embodiment. With an example illustrated in FIG. 8, the information processing device 10 starts search processing when triggered by acquisition of query data and information indicating the neighborhood range.

First, the information processing device 10 acquires the query data and information indicating the neighborhood range (step S201). In this case, the information processing device 10 calculates corresponding reference points associated with the registration data which is a neighborhood candidate of the acquired query data, and the key value range of registration data which is a neighborhood candidate (step S202). Next, the information processing device 10 searches for registration data included in the calculated key value range, that is, registration data which is a neighborhood candidate, from the index (step S203).

Next, for each registration data searched by the index, the information processing device 10 calculates the distance to query data, and determines neighborhood data (step S204). Next, the information processing device 10 outputs a list of determined neighborhood data (step S205), and finishes processing.

As described above, the information processing device 10 associates and stores registration data which is a search target, and an error parameter indicating an error of each registration data. Further, the information processing device 10 uses registration data having in a predetermined neighborhood range a value obtained by subtracting the distance corresponding to the error parameter from the distance between the query data and the registration data as neighborhood data. Consequently, the information processing device 10 can prevent search omission of registration data of a significant error. Further, the information processing device 10 does not search for registration data of little error, so that it is possible to reduce calculation cost of matching processing executed by the authentication server 3. As a result, the information processing system 1 can execute appropriate authentication processing.

Further, the information processing device 10 stores as an index distances between registration data and corresponding reference points, the maximum value of the distance between a corresponding reference point and each corresponding registration data, and the maximum value of an error parameter of each registration data corresponding to the corresponding reference point. Further, the information processing device 10 searches for registration data which is a neighborhood candidate, from the index using as a key a value calculated from the distance between query data and a corresponding reference point, and the maximum value of an error parameter of each registration data corresponding to the corresponding reference point. Then, the information processing device 10 calculates the distance between the searched registration data which is the neighborhood candidate and query data, and determines neighborhood data.

Consequently, the information processing device 10 can determine neighborhood data of the query data without calculating distances between all items of registration data and the query data. That is, the information processing device 10 excludes registration data which can be obviously excluded from neighborhood data of the query data using the index, and then calculates the distances to determine whether or not registration data is neighborhood data. Consequently, the information processing device 10 can limit the number of items of registration data for which distances to the query data are calculated. As a result, the information processing device 10 can reduce calculation cost for neighborhood search, and perform more efficient neighborhood search.

[b] Second Embodiment

With the second embodiment, an information processing device 10a will be described which more efficiently searches for neighborhood candidates by storing information other than distances between reference points and registration data as an index.

Meanwhile, a technique of performing conventional neighborhood search is directed to performing neighborhood search of query data based only on a distance between each data registered in a database and query data. Hence, when the number of items of registration data is greater or when the number of dimensions of a multi-dimensional space adopted to store registration data is greater and calculation cost of calculating distances is high, calculation cost for neighborhood search is equal to the number of times of distance calculation. That is, a technique of storing distances between reference points and registration data as an index and pruning registration data from neighborhood candidates using a triangular inequality has a problem that calculation cost increases when the number of dimensions of the multi-dimensional space is greater.

Further, the technique of pruning registration data using only distances between registration data and reference points prunes registration data having distances from reference points outside a predetermined range. Hence, when the reference point is a center point, registration data positioned on the opposite side of query data among registration data in a predetermined range may not be excluded. As a result, there is a problem that calculation cost increases when neighborhood data is determined.

The technique disclosed in the second embodiment is made in view of the above problem, and appropriately prunes data and reduces calculation cost of determining neighborhood data.

Figure 9:
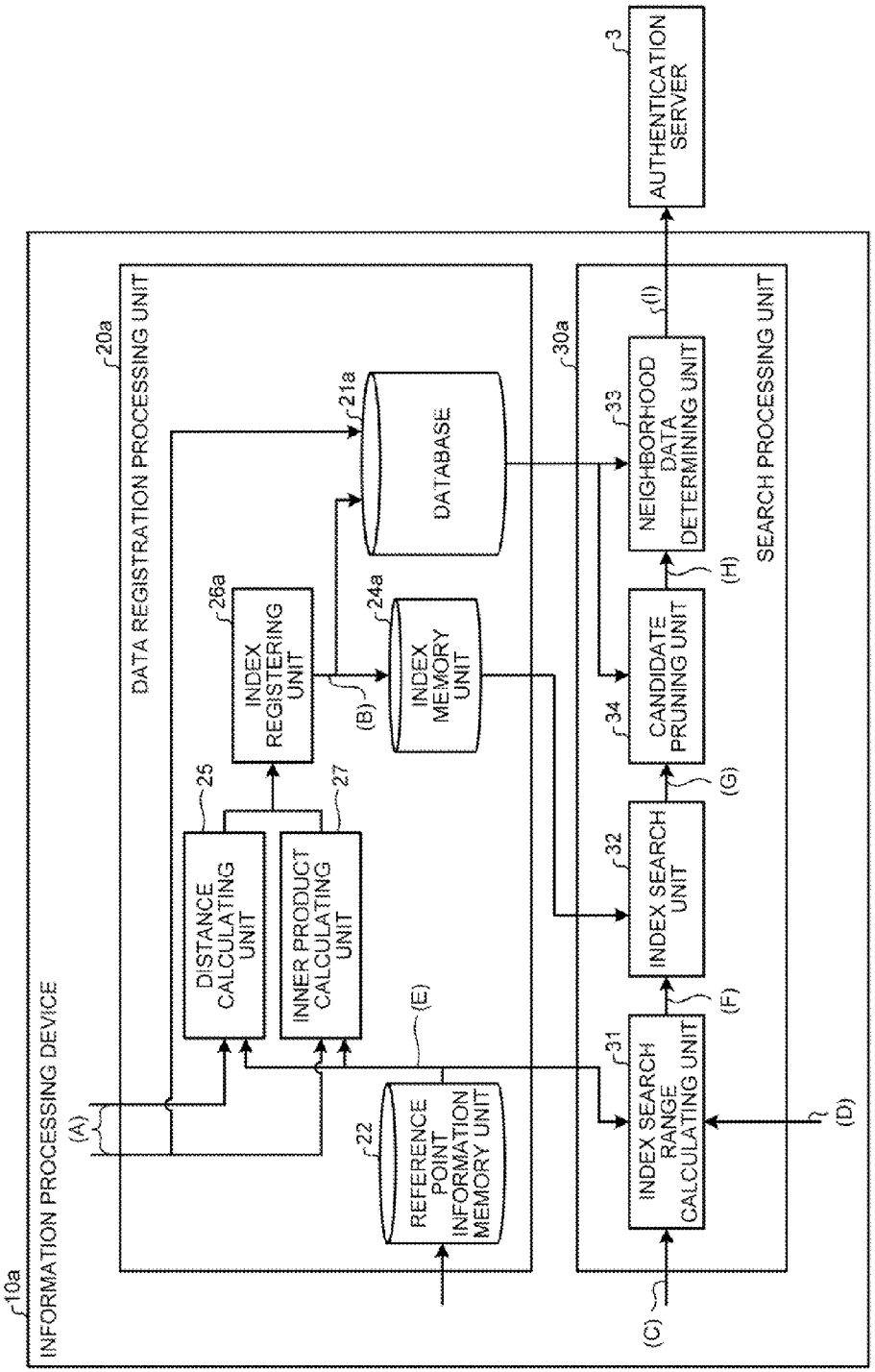
FIG. 9 is a view for describing an information processing device according to a second embodiment.

FIG. 9 is a view for describing an information processing device according to a second embodiment. With an example illustrated in FIG. 9, an information processing device 10a has a data registration processing unit 20a and a search processing unit 30a. The data registration processing unit 20a has a database 21a, the reference point information memory unit 22, an index memory unit 24a, the distance calculating unit 25, an index registering unit 26a and an inner product calculating unit 27. Further, the search processing unit 30a has the index search range calculating unit 31, the index search unit 32, a candidate pruning unit 34 and the neighborhood data determining unit 33.

In addition, each unit of the information processing device 10a which executes the same processing as each unit of the information processing device 10 according to the first embodiment will be assigned the same reference numerals, and will not be described in details. Further, in the following description, the information processing device 10a executes processing without taking an error parameter of each registration data into account. Further, similar to the information processing device 10 according to the first embodiment, the information processing device 10a is included in an information processing system 1 which matches biological data.

The database 21a associates and stores registration data, a distance between the registration data and each reference point and an inner product value of the registration data and each reference point.

Figure 10:
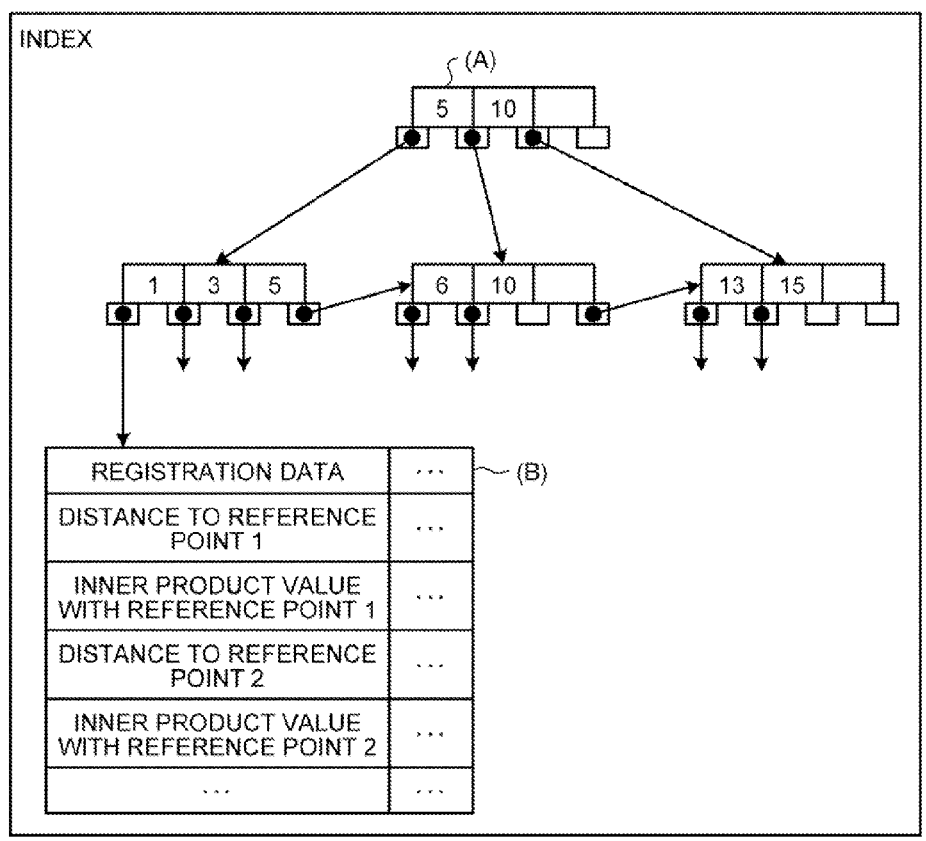
FIG. 10 is a view for describing an example of an index according to the second embodiment.

The index memory unit 24a stores as an index the distance between registration data and each reference point and an inner product value of the registration data and each reference point, using a value based on the distance between the registration data and a corresponding reference point as a key value. Meanwhile, FIG. 10 is a view for describing the index memory unit 24a. With an example illustrated in FIG. 10, the index memory unit 24a stores an index employing the same configuration as the index memory unit 24 according to the first embodiment. That is, as indicated by (A) in FIG. 10, the index memory unit 24a hierarchically has a key value based on the distance between registration data and a corresponding reference point and, as indicated by (B) in FIG. 10, stores an index associating the distance between registration data and each reference point and the inner product value with the key value.

Back to FIG. 9, the inner product calculating unit 27 calculates an inner product value of registration data and each reference point. For example, as indicated by (A) in FIG. 9, when acquiring registration data, the inner product calculating unit 27 calculates an inner product of the acquired registration data and each reference point stored in the reference point information memory unit 22. Meanwhile, the inner product calculated by the inner product calculating unit 27 is an inner product of a feature amount vector indicating registration data, and a feature amount vector indicating each reference point. In other words, when registration data is represented by a point in the multi-dimensional space, the inner product calculating unit 27 calculates an inner product of a vector using each reference point positioned in the same multi-dimensional space as an end, and a vector using the registration data as an end.

The index registering unit 26a adds the distance between registration data calculated by the distance calculating unit 25 and each reference point, and the inner product of registration data calculated by the inner product calculating unit 27 and each reference point, to the index stored in the index memory unit 24a. For example, the index registering unit 26a acquires the distance between registration data calculated by the distance calculating unit 25 and each reference point. Further, the index registering unit 26a acquires the inner product of registration data calculated by the inner product calculating unit 27 and each reference point.

Further, the index registering unit 26a calculates a key value based on the shortest distance, that is, the distance between registration data and a corresponding reference point of the registration data, among distances calculated by the distance calculating unit 25. Then, the index registering unit 26a adds the distance between registration data and each reference point and an inner product of registration data calculated by the inner product calculating unit 27 and each reference point, to the index in association with the calculated key value indicated by (B) in FIG. 9.

Further, the index registering unit 26a stores the distance between registration data and each reference point, and the inner product of registration data calculated by the inner product calculating unit 27 and each reference point, in the database 21a. Further, using a route which is not illustrated, the index registering unit 26 associates and stores the distance having the greatest value among distances to each registration data associated with corresponding reference points, and a corresponding reference point, in the reference point information memory unit 22.

Similar to the first embodiment, when acquiring query data indicated by (C) in FIG. 9 and information indicating the neighborhood range indicated by (D) in FIG. 9, the index search range calculating unit 31 calculates the distance between query data and each reference point, utilizing the distance calculating unit 25 as indicated by (E) in FIG. 9. Further, the index search range calculating unit 31 calculates a key value range for performing index search, using the distance between the calculated query data and a corresponding reference point, and information indicating the neighborhood range. Further, the index search range calculating unit 31 reports the calculated key value range to the index search unit 32 as indicated by (F) in FIG. 9.

Similar to the first embodiment, the index search unit 32 searches for the key value range acquired from the index search range calculating unit 31, from the index stored in the index memory unit 24a. Further, the index search unit 32 acquires registration data stored in association with the key value in the searched range, the distance between the registration data and each reference point, and the inner product value of the registration data and each reference point.

Then, as indicated by (G) in FIG. 9, the index search unit 32 reports the acquired registration data, the distance between the registration data and each reference point and an inner product value of the registration data and each reference point, to the candidate pruning unit 34. That is, for registration data of a neighborhood candidate acquired as a result of index search, the index search unit 32 reports registration data, the distance between registration data and each reference point and the inner product value of the registration data and each reference point, to the candidate pruning unit 34.

The candidate pruning unit 34 prunes registration data which is a neighborhood candidate, using the distance between registration data and each reference point acquired from the index search unit 32 and the inner product value of registration data and each reference point.

More specifically, for registration data which is a neighborhood candidate acquired from the index search unit 32, the candidate pruning unit 34 determines whether or not a value obtained by subtracting the distance between registration data and a corresponding reference point from the distance between query data and the corresponding reference point of the registration data is in a predetermined neighborhood range. Further, when the value obtained by subtracting the distance between registration data and a corresponding reference point from the distance between query data and the corresponding reference point of registration data is not in the predetermined range, the candidate pruning unit 34 excludes registration data from neighborhood candidates.

Further, for registration data which is a neighborhood candidate, the candidate pruning unit 34 determines whether or not a value obtained by subtracting the inner product of query data and a corresponding reference point of registration data from the inner product of registration data and a corresponding reference point. That is, the candidate pruning unit 34 determines whether or not a length is greater than the inner product of an arbitrary vector equal to the neighborhood range and a corresponding reference point of registration data. Further, the candidate pruning unit 34 executes the following processing when determining that the value obtained by subtracting the inner product of query data and a corresponding reference point of registration data from the inner product of the registration data and the corresponding reference point is greater than the inner product of the arbitrary vector and the corresponding reference point of the registration data. That is, the candidate pruning unit 34 excludes registration data from neighborhood candidates.

Further, the candidate pruning unit 34 rotates a reference point about the original point in the multi-dimensional space, on a plane parallel to the plane which passes a point at which query data is positioned in the multi-dimensional space and a point at which registration data is positioned. In this case, the candidate pruning unit 34 rotates the reference point to a position at which registration data excluded from the neighborhood candidate maximizes. Further, the candidate pruning unit 34 excludes registration data from the neighborhood candidates when determining that the value obtained by subtracting the inner product of query data and the rotated reference point from the inner product of registration data and the reference point is greater than the inner product of the arbitrary vector and the rotated reference point. Then, as indicated by (H) in FIG. 9, the candidate pruning unit 34 reports registration data which is not excluded from the neighborhood candidates, to the neighborhood data determining unit 33.

Thus, the candidate pruning unit 34 prunes the neighborhood candidates searched from the index based on the distance and the inner product. Hence, the candidate pruning unit 34 reduces the number of neighborhood candidates for which distances to query data are calculated to determine neighborhood data, and reduces calculation cost of determining neighborhood data. Further, the candidate pruning unit 34 executes pruning based on the distance and the inner product calculated in advance.

That is, the candidate pruning unit 34 can safely exclude data outside the neighborhood of query data, from search candidates without measuring the distance between registration data and query data according to the triangular inequality utilizing the distance calculated in advance and the distance between query data and a reference point. Further, the candidate pruning unit 34 can safely exclude data outside the neighborhood of query data, from search candidates without measuring the distance and the inner product value between registration data and query data, utilizing the inner product value calculated in advance and the inner product value of query data and a reference point.

Meanwhile, when pruning is performed using the distance and pruning is performed using the inner product value, data which can be pruned is different, so that it is possible to more effectively prune registration data which is a neighborhood candidate by performing pruning using the distance and pruning using the inner product value in combination. As a result, the information processing device 10a can reduce the number of distance calculated to determine neighborhood data, and promotes efficiency of neighborhood search.

Further, when performing pruning using the inner product value, the candidate pruning unit 34 executes pruning by rotating a reference point to a position at which the number of items of registration data to prune is the greatest. Consequently, the candidate pruning unit 34 can promote efficiency of neighborhood search.

Back to FIG. 9, when acquiring registration data which is left as a neighborhood candidate, the neighborhood data determining unit 33 calculates the distance between the acquired registration data and query data, and checks whether or not the registration data is neighborhood data of query data. Then, as indicated by (I) in FIG. 9, the neighborhood data determining unit 33 outputs a list of registration data which is checked as neighborhood data, to the authentication server 3.

For example, the inner product calculating unit 27 and the candidate pruning unit 34 are electronic circuits. Meanwhile, examples of electronic circuits include integrated circuits such as ASIC (Application Specific Integrated Circuit) and FPGA (Field Programmable Gate Array), or CPU (Central Processing Unit) and MPU (Micro Processing Unit).

Next, a specific example of processing executed by the information processing device 10a will be described using FIGS. 11 to 13 and mathematical expressions. In addition, in the following description, the same reference numerals as in the first embodiment are used, and the inner product of data X and data Y is represented by $<X,Y>$. Further, for ease of description, an error parameter of each registration data will not be taken into account.

First, processing of storing new data in the database 21a as registration data will be described. First, the information processing device 10a calculates the distance "$d(o_i,p)$" and the inner product value "$<o_i,p>$" of registration target data and each reference point "$o_i$ (i=1 to M)", and selects the reference point having the closest distance to registration target data as a target reference point $o_j$. Further, the information processing device 10a calculates a key value K(p) of registration target data using equation (1) and selected $o_j$.

Next, using the calculated K(p) as a key, the information processing device 10a adds the registration target data p, the distance between the calculated registration target data and each reference point, and the inner product value of the calculated registration target data and the each reference point, to the index stored in the index memory unit 24a. Further, the information processing device 10a registers the registration target data p, the distance between the calculated registration target data and each reference point and the inner product value of the calculated registration target data and each reference point. Further, the information processing device 10a associates and stores a maximum distance $r_j^{max}$, between registration data corresponding to the reference point $o_j$ and the reference point $o_j$, and $o_j$ in the reference point information memory unit 22.

Next, processing of searching for neighborhood data in the information processing device 10a will be described according to input query data and information indicating the neighborhood range. First, the information processing device 10a calculates the distance "$d(o_i,q)$" and the inner product value "$<o_i,q>$" of each reference point "$o_i$ (i=1 to M)" and query data q. Further, the information processing device 10a determines whether or not registration data associated with the reference point "$o_i$" is a neighborhood candidate using the following equation (5).

$$d(o_i,q)-U<r_i^{max} \qquad (5)$$

Next, for the reference points $o_i$ satisfying equation (5), the information processing device 10a searches for registration data having a key value in a range indicated by equation (6) from the index created in advance.

$$[d(o_i,q)+i\times C-U, d(o_i,q)+i\times C+U] \qquad (6)$$

Figure 11:
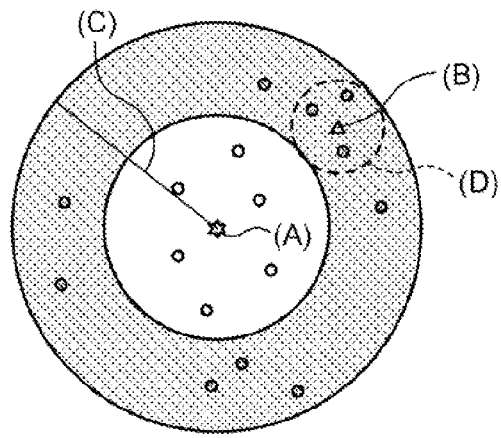
FIG. 11 is a view for describing an example of index search according to the second embodiment.

Meanwhile, FIG. 11 is a view for describing an example of index search according to the second embodiment. (A) in FIG. 11 is the reference point $o_i$, and (B) in FIG. 11 is query data. Further, (C) in FIG. 11 is the range of the reference point $o_i$ to $r_i^{max}$, and (D) in FIG. 11 indicates the range of U from query data. The information processing device 10a registers each registration data in the index, using the distance between a corresponding reference point and registration data as a key. Hence, registration data satisfying equation (6), that is, registration data which is a neighborhood candidate, is included in a donut-shaped shaded range illustrated in FIG. 11.

Next, the information processing device 10a prunes neighborhood candidates, using the distance between registration data registered in the index and each reference point and, the inner product value of registration data and each reference point. First, the information processing device 10a executes pruning using the distance between registration data and each reference point which is registered in the index and calculated in advance. More specifically, for each reference point "$o_i$ (i=1 to M)", the information processing device 10a excludes registration data satisfying the following equation (7) from neighborhood candidates. In addition, pruning using equation (7) can be executed by measuring the distance between query data and each reference point.

$$|d(o_i,q)-d(o_i,p)|>U \quad (7)$$

Figure 12:
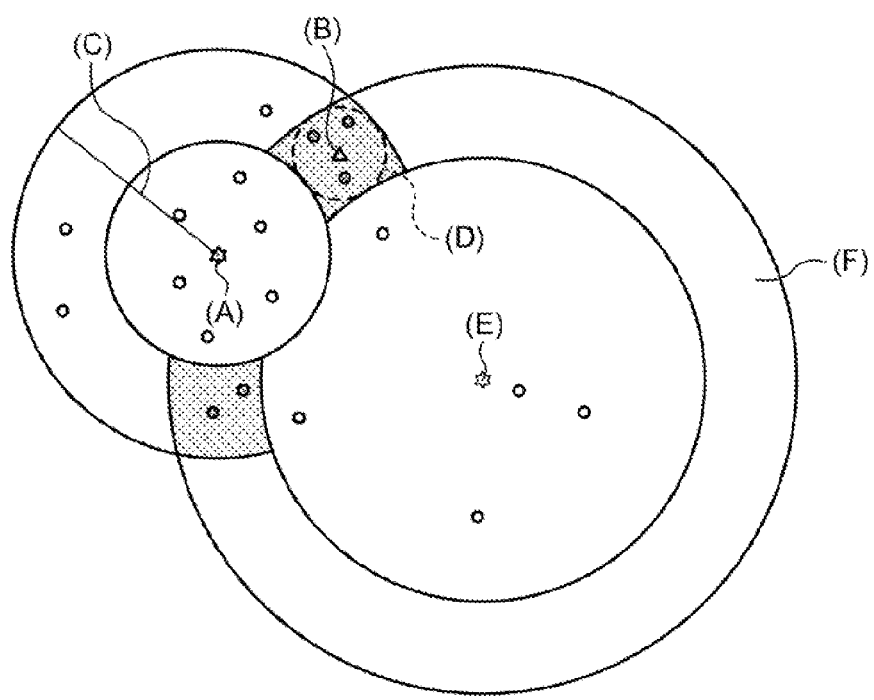
FIG. 12 is a view for describing an example of index search according to the second embodiment.

Meanwhile, FIG. 12 is a view for describing an example of index search according to the second embodiment. (A) in FIG. 12 is a reference point, and (B) in FIG. 12 is query data. Further, (C) in FIG. 12 is the range of the reference point to $r_i^{max}$, and (D) in FIG. 12 is the range of U from query data. Further, (E) in FIG. 12 is a reference point other than a corresponding reference point, and (F) in FIG. 12 is a range which does not fall under the conditions of equation (7) for the reference point indicated by (E) in FIG. 12.

That is, the information processing device 10a determines for each reference point whether or not associated registration data satisfies equation (7). As a result, the range in which registration data associated with each reference point does not satisfy equation (7), the donut-shaped range around each reference point is an overlapping portion, and therefore registration data which is a neighborhood candidate is included in the shaded range in FIG. 12.

Next, the information processing device 10a executes pruning for each reference point using the inner product value of registration data and each reference point registered in the index. More specifically, the information processing device 10a excludes registration data satisfying the following conditions of equation (8) and equation (9) from neighborhood candidates. In addition, "u" in the following equations is an arbitrary vector having a length equal to the neighborhood range U.

$$\langle o_i,p \rangle > \langle o_i,(q+u) \rangle \quad (8)$$

$$\langle o_i,p \rangle > \langle o_i,q \rangle + \langle o_i,u \rangle \quad (9)$$

Further, equation (8) and equation (9) are rewritten into the following equation (10) and equation (11). That is, the information processing device 10a can exclude registration data satisfying conditions of equation (10) and equation (11), from neighborhood candidates.

$$\langle o_i,p \rangle - \langle o_i,q \rangle > \langle o_i,u \rangle \quad (10)$$

$$|p||o_i|\cos\theta_p - |q||o_i|\cos\theta_q > U|o_i|\cos\theta_u \quad (11)$$

In addition, $\theta_p$ in equation (11) is an angle between a vector indicating the registration data p and a vector indicating the reference point $o_i$, and $\theta_q$ is an angle between a vector indicating query data q and the reference point $o_i$. Further, $\theta_u$ is an angle between an arbitrary vector u and a vector indicating the reference point $o_i$.

Meanwhile, when the direction of the arbitrary vector u is arbitrary and therefore when "$\cos\theta_u=1$" holds, if the following equation (12) holds, equation (10) and equation (11) hold for arbitrary u. That is, the information processing device 10a can exclude registration data satisfying equation (12) from neighborhood candidates.

$$||p|\cos\theta_p - |q|\cos\theta_q| > U \quad (12)$$

In addition, the information processing device 10a can easily calculate "$|p|\cos\theta_p$" from an inner product "$<o_i,p>=|o_i||p|\cos\theta_p$" registered in the index. Further, the information processing device 10a only needs to calculate "$|q|\cos\theta_q$" for each reference point once upon execution of search processing.

Next, processing of rotating the reference point by "α" about the original point in the multi-dimensional space, on a plane parallel to the plane passing query data and registration data. In this case, "$\theta_p$" in equation (12) is "$\theta_p \pm \alpha$" and "$\theta_q$" is "$\theta_q \pm \alpha$". Consequently, it is possible to deform equation (12) to the following equation (13).

$$\begin{cases} ||p|\cos(\theta_p+\alpha)-|q|\cos(\theta_q+\alpha)|>U \\ ||p|\cos(\theta_p+\alpha)-|q|\cos(\theta_q-\alpha)|>U \end{cases} \quad (13)$$

That is, the information processing device 10a can exclude registration data satisfying equation (13) from neighborhood candidates. Meanwhile, "α" which maximizes the left side of equation (13) is taken into account, and therefore, when an equation differentiating equation (13) by "α" is taken into account, the neighborhood range "U" does not change due to the change of "α", and "dU/dα=0" holds. As a result, equation (13) can be deformed to the following equation (14).

$$\begin{cases} -|p|\sin(\theta_p+\alpha)+|q|\sin(\theta_q+\alpha)=0 \\ -|p|\sin(\theta_p+\alpha)+|q|\sin(\theta_q-\alpha)=0 \end{cases} \quad (14)$$

By solving this equation (14) with respect to "α", the following equation (15) can be obtained.

$$\tan\alpha = \begin{cases} \dfrac{-|q|\sin\theta_q+|p|\sin\theta_p}{|q|\cos\theta_q-|p|\cos\theta_p} \\ \dfrac{|q|\sin\theta_q+|p|\sin\theta_p}{|q|\cos\theta_q-|p|\cos\theta_p} \end{cases} \quad (15)$$

That is, when "α" satisfies equation (15), the left side of equation (13) maximizes, and, when registration data satisfying conditions of equation (13) in case of "α" satisfying equation (15) is excluded, it is possible to exclude the greatest number of registration data from neighborhood candidates.

Figure 13:
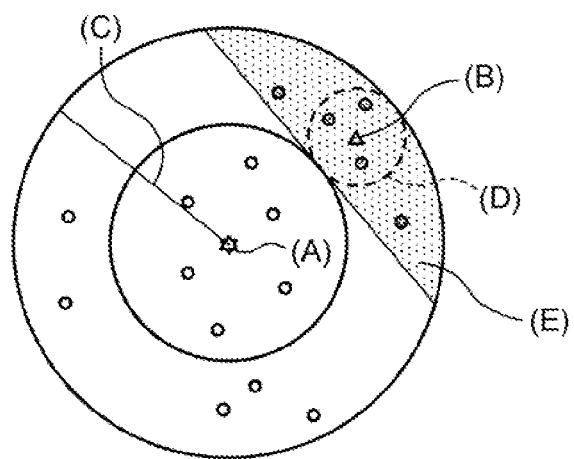
FIG. 13 is a view (3) for describing an example of index search according to the second embodiment.

Meanwhile, FIG. 13 is a view (3) for describing an example of index search according to the second embodiment. (A) in FIG. 13 is a corresponding reference point, (B) in FIG. 13 is query data and (C) in FIG. 13 is a range of $r_i^{max}$ from corresponding reference data. Further, (D) in FIG. 13 is a neighborhood range indicated by U. With the information processing device 10a, when pruning is executed based on the inner product value of registration data and each reference point, an area encircled by a line orthogonal to the vector of the reference point is provided. Consequently, the information processing device 10a can limit neighborhood candidates to registration data included in the shaded range indicated by (E) in FIG. 13.

Meanwhile, although it is preferable to set a reference point to an appropriate position in advance to efficiently prune neighborhood candidates, it is difficult to predict what query data is input when the index is created. However, when neighborhood search is performed for registration data which is similar to query data for which the information processing device 10 performs biometric authentication, distribution data similar to registration target data is regarded to be input as query data. Consequently, it is possible to fix reference points to effectively prune, using the distribution of registration target data.

For example, to increase the number of items of registration data to be pruned based on the distance, the information processing device 10a only needs to calculate a position of the reference point which maximizes the following equation (16) and sets the reference point to the calculated position.

$$F_A = \frac{1}{W} \sum_{1 \le i \le W} \max_{1 \le k \le K} |d(a_i, o_k) - d(o_k, a'_i)| \qquad (16)$$

Further, to increase the number of items of registration data to be pruned based on the inner product value, the information processing device 10a only needs to calculate the position of the reference point which maximizes the following equation (17), and sets the reference point to the calculated position.

$$F_B = \frac{1}{W} \sum_{i=1}^{W} \max_{1 \le k \le K} |\langle o_k, a_i \rangle - \langle o_k, a'_i \rangle| = \\ \frac{1}{W} \sum_{i=1}^{W} \max_{1 \le k \le K} ||a_i||o_k|\cos\theta_{a_i} - |a'_i||o_k|\cos\theta_{a_{i'}}|| \qquad (17)$$

In addition, "B. Bustos, G. Navarro, and E. Chaves" proposes a method of selecting the reference point which maximizes equation (16) from registration data. Further, taking into account that the reference point is rotated by "α" for equation (17), the reference point may be set to increase the number of items of registration data to be pruned. Further, the information processing device 10a may select registration data which maximizes equation (16) and equation (17) or the weighted sum of equation (16) and equation (17) among registration data as a reference point. Further, the information processing device 10a may set a reference point to a position which maximizes equation (16) and equation (17) or the weighted sum of equation (16) and equation (17) among registration data as a reference point.

Figure 14:
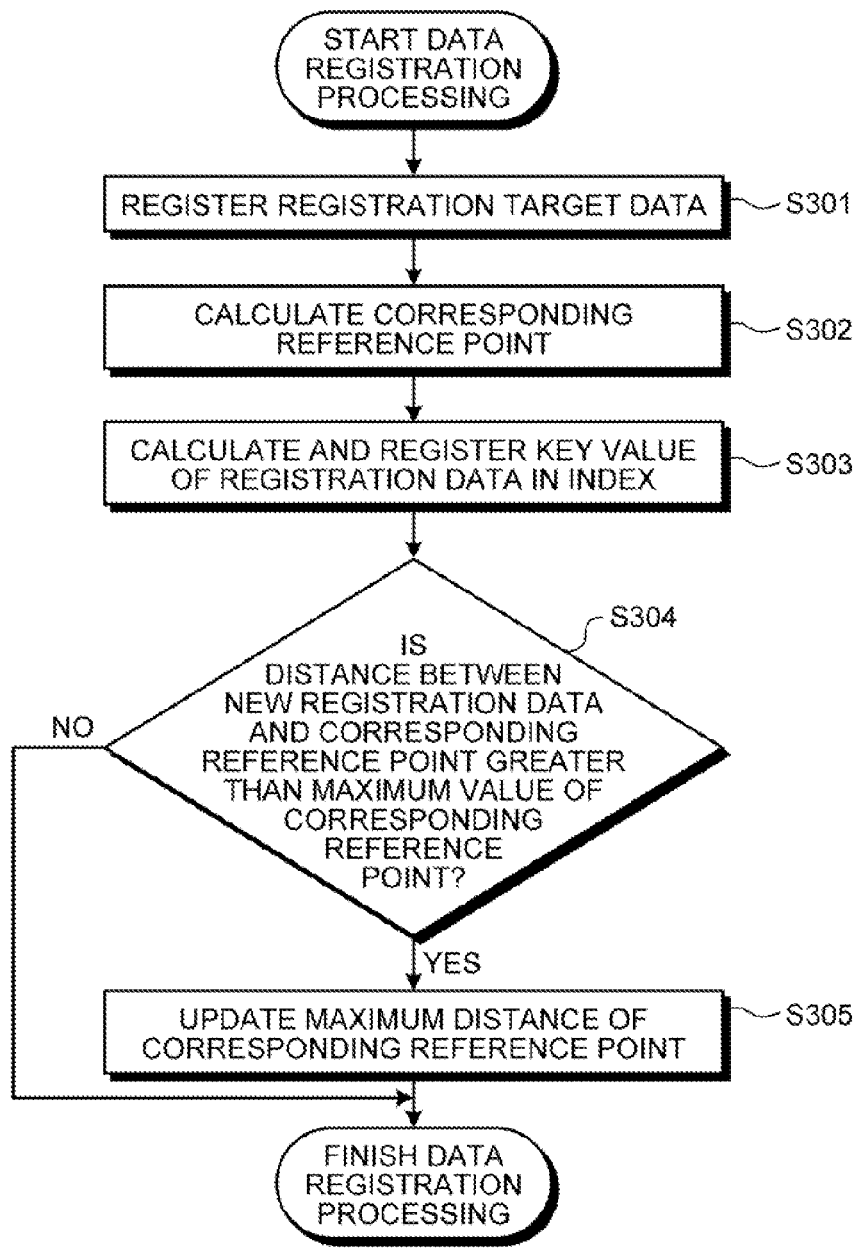
FIG. 14 is a flowchart for describing an example of a flow of registration processing according to the second embodiment.

Next, an example of a flow of processing of registering new data by the information processing device 10a will be described using FIG. 14. FIG. 14 is a flowchart for describing an example of a flow of registration processing according to the second embodiment. With an example illustrated in FIG. 14, the information processing device 10a starts processing when triggered by reception of data to be registered in the database 21a.

First, the information processing device 10a registers data of registration targets in the database 21a (step S301). Further, the information processing device 10a calculates a reference point corresponding to the new registration data (step S302). Next, the information processing device 10a calculates a key value of new registration data, and associates the distance between the new registration data and each reference point and the inner product value of the new registration data and each reference point, with the key value to register in the index (step S303).

Next, the information processing device 10a determines whether or not the distance between the corresponding reference point and the new registration data is greater than the maximum value of the distance associated with the corresponding reference point (step S304). Further, the information processing device 10a executes the following processing when determining that the distance between the corresponding reference point and the new registration data is greater than the maximum value of the distance associated with the corresponding reference point (Yes in step S304). That is, the information processing device 10a updates the maximum value of the distance associated with the corresponding reference point (step S305). Then, the information processing device 10a finishes processing.

By contrast with this, the information processing device 10a finishes processing as is when determining that the distance between the corresponding reference point and the new registration data is smaller than the maximum value of the distance associated with the corresponding reference point (No in step S304).

Figure 15:
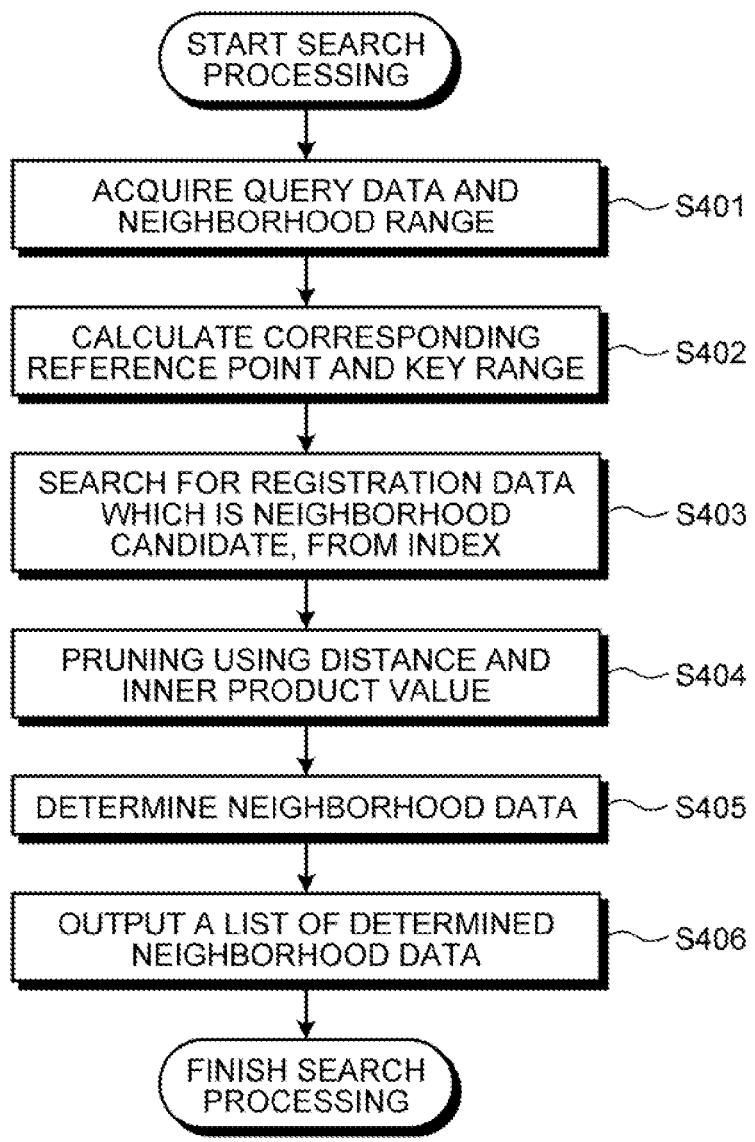
FIG. 15 is a flowchart for describing an example of a flow of search processing according to the second embodiment.

Next, an example of a flow of processing of searching for neighborhood data of input query data by the information processing device 10 will be described using FIG. 15. FIG. 15 is a flowchart for describing an example of a flow of search processing according to the second embodiment. With an example illustrated in FIG. 15, the information processing device 10a starts search processing when triggered by acquisition of query data and information indicating the neighborhood range.

First, the information processing device 10a acquires the query data and information indicating the neighborhood range (step S401). In this case, the information processing device 10a calculates corresponding reference points associated with the registration data which is a neighborhood candidate of the acquired query data, and the key value range of registration data which is a neighborhood candidate (step S402). Next, the information processing device 10a searches for registration data which is a neighborhood candidate from the index, using the calculated key value range (step S403).

Next, the information processing device 10a prunes neighborhood candidates, using the distance and the inner product value acquired from the searched index (step S404). That is, the information processing device 10a prunes neighborhood candidates using the distance between the registration data acquired from the index and each reference point. Therefore the information processing device 10a prunes neighborhood candidates, using the inner product value of registration data acquired from the index and each reference point.

Next, for each registration data included in the pruned neighborhood candidates, the information processing device 10a calculates the distance to query data, and determines neighborhood data (step S405). Further, the information processing device 10a outputs a list of determined neighborhood data to the authentication server 3 (step S406), and finishes processing.

As described above, the information processing device 10a stores in advance as the index the distances between a plurality of reference points and registration data, and the inner product value of a plurality of reference points and the registration data. Further, the information processing device 10a prunes registration data which is a neighborhood candidate searched by using the index, using a plurality of distances and a plurality of inner product values stored in advance as the index.

More specifically, when pruning is performed using the distances, the information processing device 10a determines for each reference point whether or not the difference between the distance between query data and a reference point and the distance between registration data and the reference point settles in a predetermined neighborhood range. Further, the information processing device 10a excludes this registration data from neighborhood candidates when determining that the difference between the distance between query data and the reference point and the distance between registration data and the reference point does not settle in a predetermined neighborhood range.

Further, when performing pruning using the inner product values, the information processing device 10a determines for each reference point whether or not a value obtained by subtracting the inner product value of query data and a reference point from the inner product value of registration data and a reference point settles in a predetermined value. Meanwhile, the predetermined range is an inner product value of an arbitrary vector and a reference point having the same size as the neighborhood range. Further, the information processing device 10a excludes this registration data from the neighborhood range when determining for each reference point that the value obtained by subtracting the inner product value of query data and a reference point from the inner product value of registration data and a reference point is greater than a predetermined value.

Consequently, when pruning using the distances and pruning using inner product values are used in combination, the information processing device 10a can exclude more items of registration data from the neighborhood candidates by pruning using only the distances. That is, more items of registration data are excluded from the neighborhood candidates compared to a case where only the triangular inequality is used based on a conventional distance, the information processing device 10a can reduce the number of times of calculation of distances to query data and perform more efficient neighborhood search.

Further, the information processing device 10a rotates reference data about the original point such that the number of registration data excluded from neighborhood candidates is maximum. Further, the information processing device 10 uses the rotated reference data, and executes pruning using the inner product value. Consequently, the information processing device 10a can exclude more items of registration data from neighborhood candidates.

That is, when performing pruning using the inner product value, the information processing device 10a excludes registration data included in an area encircled by a line orthogonal to the vector of the reference point, from the neighborhood candidates. Meanwhile, when the reference point is rotated about the original point, the area encircled by the line orthogonal to the vector of the reference point moves. Consequently, the information processing device 10a can use reference data which allows the most efficient pruning and perform pruning using the inner product value.

[c] Third Embodiment

With the third embodiment, an information processing device 10b will be described which more efficiently searches for neighborhood candidate by storing information other than distances between reference points and registration as an index.

That is, a technique of performing conventional neighborhood search stores all distances between a plurality of reference points and registration data in the index. Hence, when the number of items of registration data is great or when the number of reference points is great, more items of data needs to be registered in the index, and therefore there is a problem that storage capacity for storing the index is great. Further, when the number of reference points is great, reference points associated with neighborhood data of query data are searched, and therefore the number of calculation of distances between query data and reference points becomes great. As a result, the technique of performing conventional neighborhood search increases calculation cost of performing neighborhood search, and has a problem that appropriate neighborhood search may not be performed.

The technique disclosed in the third embodiment is made in view to the above problem, and reduces calculation cost of executing neighborhood search.

Figure 16:
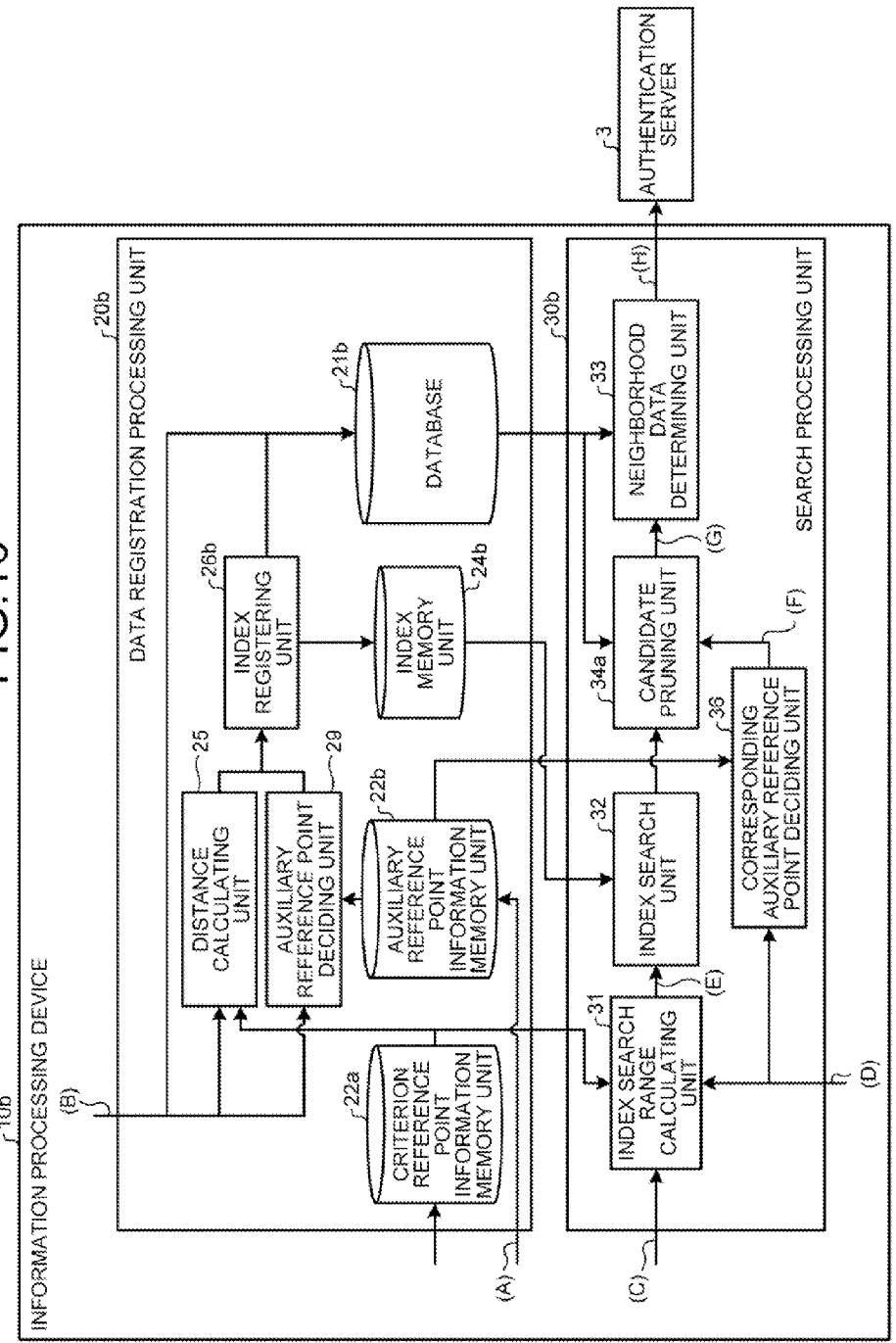
FIG. 16 is a view for describing an information processing device according to a third embodiment.

FIG. 16 is a view for describing an information processing device according to the third embodiment. With an example illustrated in FIG. 16, the information processing device 10b has a data registration processing unit 20b and a search processing unit 30b. Further, the data registration processing unit 20b has a database 21b, a criterion reference point information memory unit 22a, an auxiliary reference point information memory unit 22b, an index memory unit 24b, the distance calculating unit 25, an index registering unit 26b and an auxiliary reference point deciding unit 29. Further, the search processing unit 30b has an index search range calculating unit 31, a neighborhood data determining unit 33, an index search unit 32, a corresponding auxiliary reference point deciding unit 36 and a candidate pruning unit 34a.

In addition, each unit of the information processing device 10b which executes the same processing as each unit of the information processing device 10 according to the first embodiment and the information processing device 10a according to the second embodiment will be assigned the same reference numerals, and will not be described in details. Further, in the following description, the information processing device 10b executes processing without taking an error parameter of each registration data into account. Further, similar to the information processing device 10 according to the first embodiment, the information processing device 10b is included in an information processing system 1 which matches biological data.

The database 21b associates and stores registration data, an identifier indicating an auxiliary reference point corresponding to registration data and the distance to the corresponding auxiliary reference point corresponding to the registration data. Meanwhile, the auxiliary reference point is set in advance to prune neighborhood candidates.

The criterion reference point information memory unit 22a stores the criterion reference point set in advance. Meanwhile, the criterion reference point has the same significance as the first and second embodiments. That is, the criterion reference point information memory unit 22a stores the same information as the reference point information memory unit 22 according to the first and second embodiments.

The auxiliary reference point information memory unit 22b stores an auxiliary reference point set in advance. More specifically, as indicated by (A) in FIG. 16, the auxiliary reference point information memory unit 22b stores information indicating the position (or feature amount vector) of the auxiliary reference point set in advance.

The index memory unit 24b stores the following information as the index using a value based on the distance between registration data and a corresponding criterion reference point as a key value. That is, the index memory unit 24b stores registration data, an identifier of the corresponding auxiliary reference point selected by the auxiliary reference point deciding unit 29, and the distance between the registration data and the corresponding auxiliary reference point as the index.

Figure 17:
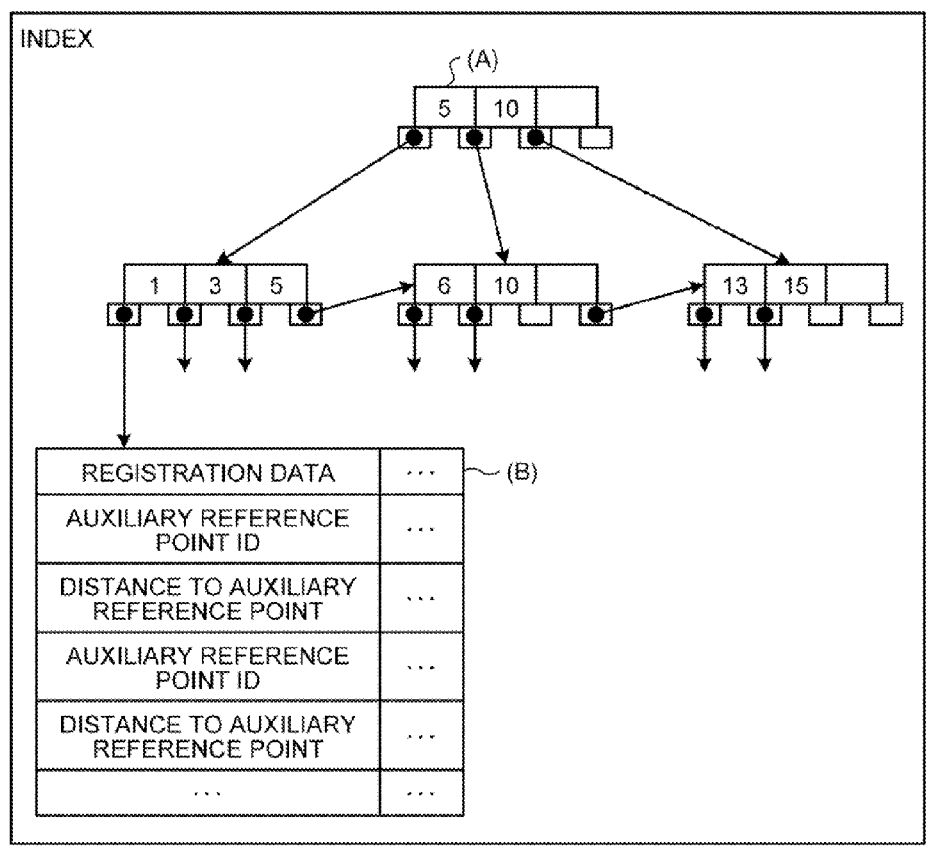
FIG. 17 is a view for describing an example of an index according to the third embodiment.

Meanwhile, FIG. 17 is a view for describing an example of an index according to the third embodiment. With an example illustrated in FIG. 17, the index memory unit 24b stores an index employing the same configuration as the index memory units 24 and 24a according to the first and second embodiments. That is, as indicated by (A) in FIG. 17, the index memory unit 24b hierarchically has a key value based on the distance between registration data and a corresponding criterion reference point. Further, as indicated by (B) in FIG. 16, the index memory unit 24b stores an index associating the identifier (ID) of registration data and each corresponding auxiliary reference point and the distance between registration data and each corresponding auxiliary reference point.

Back to FIG. 16, similar to the distance calculating units according to the first and second embodiments, when receiving registration target data to be registered in the database 21b, the distance calculating unit 25 calculates the distance between registration target data and each criterion reference point stored in the criterion reference point information memory unit 22a.

The auxiliary reference point deciding unit 29 selects a plurality of auxiliary reference points corresponding to registration target data, and reports a plurality of selected auxiliary reference points to the index registering unit 26. More specifically, as indicated by (B) in FIG. 16, when receiving registration data, the auxiliary reference point deciding unit 29 selects a plurality of auxiliary reference points corresponding to the registration data received from the auxiliary reference point stored in the auxiliary reference point information memory unit 22b. Then, the auxiliary reference point deciding unit 29 reports identifiers indicating a plurality of selected auxiliary reference points, to the index registering unit 26.

Further, the auxiliary reference point deciding unit 29 calculates the distance between each selected auxiliary reference point and registration target data, and reports the calculated distance to the index registering unit 26b. In addition, instead of being executed by the auxiliary reference point deciding unit 29, this processing may be realized by reporting the selected auxiliary reference point to the distance calculating unit 25 and calculating the distance between registration data and the reported auxiliary reference point.

Meanwhile, the auxiliary reference point deciding unit 29 selects a plurality of auxiliary reference points which are regarded to be close to registration data as auxiliary reference points. In other words, the auxiliary reference point deciding unit 29 selects a plurality of auxiliary reference points close to registration data by approximate neighborhood search. This selection of the auxiliary reference point does not require strict neighborhood search, and the auxiliary reference point can be selected at a high speed by utilizing approximate neighborhood search.

Hereinafter, an example where an auxiliary reference point is selected utilizing the index using the criterion reference point and an example where the auxiliary reference point is selected utilizing locality sensitive hashing (LSH) will be described as an example of processing of selecting the auxiliary reference point.

First, an example will be described where the auxiliary reference point deciding unit 29 selects an auxiliary reference point utilizing the index using the criterion reference point. The auxiliary reference point deciding unit 29 selects the closest criterion reference point in advance for each auxiliary reference point. Further, the auxiliary reference point deciding unit 29 creates an auxiliary reference point index which stores identifiers indicating auxiliary reference points, using a value based on the distance between the selected criterion reference point and the auxiliary reference point as a key value.

Further, when receiving registration target data, the auxiliary reference point deciding unit 29 calculates the distance between the received registration target data and the criterion reference point. Further, the auxiliary reference point deciding unit 29 selects an auxiliary reference point which settles a difference between the distance between the auxiliary reference point and the criterion reference point and the distance between the calculated registration target data and the criterion reference point in a predetermined range, using the auxiliary reference point index created in advance. Then, the auxiliary reference point deciding unit 29 acquires the identifier of the auxiliary reference point selected from the auxiliary reference point index, and reports the acquired identifier to the index registering unit 26a.

In addition, the auxiliary reference point deciding unit 29 may store the auxiliary reference point index in the auxiliary reference point information memory unit 22b, and may further report the auxiliary reference point index to the corresponding auxiliary reference point deciding unit 36 which will be described.

Next, an example will be described where the auxiliary reference point deciding unit 29 selects an auxiliary reference point utilizing LSH. Meanwhile, the processing of selecting the auxiliary reference point utilizing LSH is directed to performing approximate neighborhood search using the hash function. Neighborhood search utilizing this LSH has various variations including the following method disclosed in M. Datar, N. Immorlica, P. Indyk, and V. S. Mirrokni: Locality-Sensitive Hashing Scheme Based on p-Stable Distributions, Proceedings of the twentieth annual symposium on Computational geometry (SCG '04), pp. 253-262 (2004).

In addition, with the present embodiment, although an Euclidean distance is taken into account in the distance function, nothing is taken into account in case of LSH supporting the distance function to be utilized.

For example, the auxiliary reference point deciding unit 29 calculates a hash value of the auxiliary reference point in advance using the hash function including a uniform random number in the term, and creates a hash table which stores hash values of the calculated auxiliary reference points. Further, the auxiliary reference point deciding unit 29 creates a plurality of hash values of registration data using the same hash function as the hash function used to create the hash table.

Further, the auxiliary reference point deciding unit 29 refers to the hash table, and selects a plurality of auxiliary reference points from which the same hash value as a plurality of hash values created from registration data are calculated. Further, the auxiliary reference point deciding unit 29 reports the identifier indicating the selected auxiliary reference point, to the index registering unit 26.

In addition, the auxiliary reference point deciding unit 29 may transmit the created hash table to the corresponding auxiliary reference point deciding unit 36, and may further store the hash table in the auxiliary reference point information memory unit 22b.

The index registering unit 26b acquires the distance between registration target data calculated by the distance calculating unit 25 and a corresponding criterion reference point. Further, the index registering unit 26b acquires the auxiliary reference point selected by the auxiliary reference point deciding unit 29, that is, the identifier of each corresponding auxiliary reference point, and the distance between registration data and each auxiliary reference point. Further, the index registering unit 26b calculates the key value from the distance acquired from the distance calculating unit 25, and adds the identifier of each auxiliary reference point and the distance reported from the auxiliary reference point deciding unit 29, to the index in association with the calculated key value.

Similar to the first and second embodiments, when acquiring query data and information indicating the neighborhood range indicated by (C) and (D) in FIG. 16, the index search range calculating unit 31 calculates the key value range in which index search is performed. Further, as indicated by (E) in FIG. 16, the index search range calculating unit 31 reports the calculated key value range to the index search unit 32.

Similar to the first and second embodiments, when acquiring the key value range from the index search range calculating unit 31, the index search unit 32 searches for the acquired key value range from the index stored in the index memory unit 24b. Further, the index search unit 32 acquires registration data stored in association with the searched key value range, the identifier of each corresponding auxiliary reference point and the distance between registration data and each corresponding auxiliary reference point. Then, the index search unit 32 transmits each acquired information to the candidate pruning unit 34a.

The corresponding auxiliary reference point deciding unit 36 approximately searches for the auxiliary reference point in the neighborhood of query data. Further, the corresponding auxiliary reference point deciding unit 36 transmits the searched auxiliary reference point to the candidate pruning unit 34a.

Meanwhile, similar to the auxiliary reference point deciding unit 29, the corresponding auxiliary reference point deciding unit 36 selects the auxiliary reference point which is regarded to be close to query data, using approximate neighborhood search. For example, the corresponding auxiliary reference point deciding unit 36 calculates the distance between query data and each criterion reference point, and decides the corresponding criterion reference point of registration data which is a neighborhood candidate.

Further, the corresponding auxiliary reference point deciding unit 36 searches for the auxiliary reference point index created by the auxiliary reference point deciding unit 29, using the distance between the corresponding criterion reference point and query data as a key value. Further, as indicated by (F) in FIG. 16, the corresponding auxiliary reference point deciding unit 36 searches for the auxiliary reference point index, and reports the identifier of the auxiliary reference point acquired as a result, to the candidate pruning unit 34a.

Meanwhile, the corresponding auxiliary reference point deciding unit 36 may select the auxiliary reference point utilizing LSH. In this case, similar to the auxiliary reference point deciding unit 29, the corresponding auxiliary reference point deciding unit 36 calculates a hash value of query data. Further, the corresponding auxiliary reference point deciding unit 36 selects the auxiliary reference point for which the same hash value as the calculated hash value is calculated, from the hash table created by the auxiliary reference point deciding unit 29. In addition, in this case, the corresponding auxiliary reference point deciding unit 36 may receive the hash table from the auxiliary reference point deciding unit 29, and may refer to the hash table stored in, for example, the auxiliary reference point information memory unit 22b.

The candidate pruning unit 34a acquires an identifier of registration data which is a neighborhood data and each corresponding auxiliary reference point, from the index search unit 32. Further, the candidate pruning unit 34a acquires the identifier of the auxiliary reference point selected by the corresponding auxiliary reference point deciding unit 36. In this case, the candidate pruning unit 34a determines overlapping auxiliary reference points among the identifier of the corresponding auxiliary reference points acquired from the index search unit 32 and auxiliary reference points selected by the corresponding auxiliary reference point deciding unit 36. Further, the candidate pruning unit 34a determines whether or not the difference between the distance between the determined auxiliary reference point and query data and the distance between the determined auxiliary reference point and registration data settles in a predetermined range. Then, the candidate pruning unit 34a excludes registration data from the neighborhood candidates when determining that the difference between the distances does not settle in a predetermined range.

Then, as indicated by (G) in FIG. 16, the candidate pruning unit 34a transmits registration data which is not excluded from the neighborhood candidate, to the neighborhood data determining unit 33. The neighborhood data determining unit 33 calculates the distance to query data for the neighborhood candidate received from the candidate pruning unit 34a, and determines neighborhood data. Further, as indicated by (H) in FIG. 16, the neighborhood data determining unit 33 transmits the list of the determined neighborhood data, to the authentication server 3.

As described above, the information processing device 10b stores distances to a plurality of auxiliary reference points which are regarded to be in the neighborhood of each registration data, and prunes neighborhood candidates using only auxiliary reference points which are regarded to be close to query data upon search processing. Hence, the information processing device 10b can reduce the memory usage compared to a case where distances to all reference points are stored.

For example, the number of pieces of distance information which need to be stored according to a method of storing the distances to all reference points is "the number of reference points×the number of items of registration data". By contrast with this, with the third embodiment, the number of pieces of distance information stored in the information processing device 10b is "the number of items of registration data+the number of registration data×the number of neighborhood auxiliary reference points of registration data". Meanwhile, the number of neighborhood auxiliary reference points is generally smaller than the number of items registration data, so that the total number of pieces of distance information is less than the method of storing distances to all reference points. Hence, the information processing device 10b reduces the memory usage.

Further, for example, the number of calculation of distances to reference points upon search in the method of storing the distances to all reference points is "the number of reference points". By contrast with this, with the third embodiment, the number of calculation of distances to reference points that the information processing device 10b requires upon search is "the number of criterion reference points+the number of neighborhood auxiliary reference points of query data". This number of calculation of distances is smaller than the sum of the criterion reference points and the auxiliary reference points. Consequently, the information processing device 10b can reduce calculation cost of executing neighborhood search, and perform efficient neighborhood search.

For example, the auxiliary reference point deciding unit 29 and the corresponding auxiliary reference point deciding unit 36 are electronic circuits. Meanwhile, examples of electronic circuits include integrated circuits such as ASIC (Application Specific Integrated Circuit) and FPGA (Field Programmable Gate Array), or CPU (Central Processing Unit) and MPU (Micro Processing Unit).

Next, a specific example of processing of registering registration target data p by the information processing device 10b will be described using mathematical expressions. In addition, in the following description, the same symbols as in the first and second embodiments will be described. Further, each auxiliary reference point "$s_1$ to $s_N$", and the number of auxiliary reference points is "N". Further, for ease of description, an error parameter of each registration data will not be taken into account.

In the following description, an ID set of auxiliary reference points which are regarded to be close to registration target data is set as $X_p$. As described above, processing of finding $X_p$ by the information processing device 10b includes a method of utilizing an index using the criterion reference point and a method of utilizing LSH. Hence, in the following description a method of utilizing the index using the criterion reference point will be first described, and the method of utilizing LSH will be described next.

First, the method of utilizing the index using the criterion reference point will be described. First, the information processing device 10b selects the closest criterion reference point $o_j$ for each auxiliary reference point in advance. Further, using the following equation (18), a key value $K_s(S_i)$ of the auxiliary reference point index is generated, and the auxiliary reference point index is created.

$$K_s(S_i) = d(o_j, s_i) + j \times C \tag{18}$$

In addition, C in equation (18) is a constant. Hence, the key value of the auxiliary reference point corresponding to the criterion reference point $o_j$ settles in the range of [j×C, (j+1)× C).

Then, the information processing device 10b searches for $N_p$ auxiliary reference points which are regarded to be close to the registration target data p, using the created auxiliary reference point index, and obtains an ID set Xp of corresponding auxiliary reference points. That is, the information processing device 10b calculates the distance ($o_i$,p) between the criterion reference point $o_i$ (i=1 to M) and the registration target data p. Further, the information processing device 10b selects d ($o_i$,p) satisfying the following equation (19). Meanwhile, "$u_i^{max}$" in equation 19 indicates the maximum distance among distances between auxiliary reference points associated with the criterion reference point $o_i$ and the criterion reference point $o_i$. Further, "t" indicates the range in which auxiliary reference points are searched.

$$d(o_i,p) - t < u_i^{max} \tag{19}$$

Further, the information processing device 10b searches for auxiliary reference points stored in association with key values in the range of [d($o_i$,p)+i×C−T,d($o_i$,p)+i×C+T] based on selected d($o_i$,p), from the auxiliary reference point index. Meanwhile, by operating "t" in FIG. 18, the number of auxiliary reference points to be searched changes. Hence, when the number of searched auxiliary reference points does not reach $N_p$ which is an upper limit of the search result, the information processing device 10b may further search for auxiliary reference points by increasing "t". Further, when a number of auxiliary reference points greater than $N_p$ is searched, the information processing device 10b may select $N_p$ auxiliary reference points from the searched auxiliary reference points at random, and uses the selected auxiliary reference point as $X_p$. Further, the information processing device 10b calculates the distances between the searched auxiliary reference points and registration target data, and acquires an auxiliary reference point which is in the strict neighborhood.

Next, processing of finding $X_p$ utilizing LSH will be described. For example, the information processing device 10b calculates L hash tag values $g_j(p)$ of the registration target data p, using the following equation (20) and equation (21).

$$g_j(p) = (h_{1,j}(p), h_{2,j}(p), \ldots, h_{k,j}(p)) \tag{20}$$

$$h(p) = \left\lfloor \frac{a \cdot p + z}{w} \right\rfloor \tag{21}$$

Meanwhile, "a" in equation (21) is a random vector according to a normal distribution in which each coordinate value has 0 of an average and 1 of dispersion, and "z" is a uniform random number where the range is [0,w]. When calculating the hash value $g_j(p)$, the information processing device 10b searches for auxiliary reference points having the same hash value as the calculated hash value $g_j(p)$, from the hash table.

Meanwhile, the hash table stores the hash values $g_j(s_i)$ (i=1 to M, j=1 to L) of the auxiliary reference points calculated using the same equations as equation (19) and equation (20). When searching for the auxiliary reference points which are in the neighborhood of the registration target data p by this approximate neighborhood search, the information processing device 10b can select an auxiliary reference point which is in the neighborhood of the registration target data p at a high probability. In addition, when utilizing LSH, the information processing device 10b searches only for data of a matching hash value, and consequently, can execute this search at a high speed compared to a case where distance calculation is performed.

Next, processing of registering registration target data in the index will be described. For example, the information processing device 10b calculates the distance d($o_i$,p) between the registration data p and each criterion reference point $o_i$ (i=1 to M). Further, the information processing device 10b selects the criterion reference point of minimum d ($o_i$,p) as the corresponding criterion reference point $o_j$.

Next, the information processing device 10b calculates the key value K(p) of the registration target data p, using the following equation (22).

$$K(p) = d(o_j,p) + j \times C \tag{22}$$

Next, the information processing device 10b adds the registration target data to the index, using the calculated K(p) as a key. In the following description, the set of data registered in the index is "$I_{data}$". Next, the information processing device 10b registers the distance $\{d(s_i,p) | i \in X_p\}$ between the auxiliary reference point included in the set $X_p$ selected using the auxiliary reference data index or LSH and the registration target data p, and p in the index. Further, the information processing device 10b stores the greatest distance to the criterion reference point $o_j$ among registration data corresponding to the criterion reference point $o_j$ as $r_j^{max}$ in the index.

Figure 18:
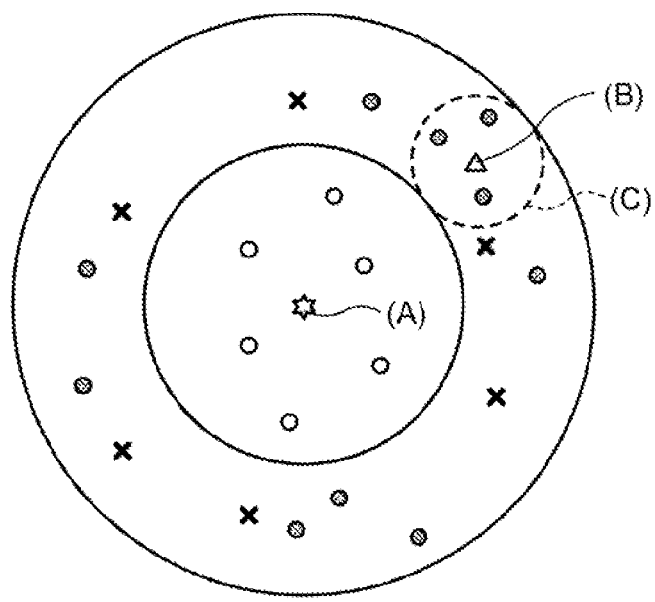
FIG. 18 is a view for describing an example of auxiliary reference point selection processing according to the third embodiment.

Next, processing of searching for neighborhood data of query data by the information processing device 10b will be described using FIGS. 18 and 19 and mathematical expressions. First, the information processing device 10b calculates the distance d ($o_i$,q) between each criterion reference point $o_i$ (i=1 to M) and query data q, and determines whether or not registration data associated with $o_i$ is a neighborhood candidate, using the following equation (23).

$$d(o_i,q) - U < r_i^{max} \tag{23}$$

Next, the information processing device 10b searches for registration data having a key value in the range of [d($o_i$,p)+i×C−U, d($o_i$,p)+i×C+U] from the index $I_{data}$ for the criterion reference point $o_i$, and makes the searched registration data as a set Y of neighborhood candidates. This set Y includes shaded circles illustrated in FIG. 18. Meanwhile, FIG. 18 is a view for describing an example of auxiliary reference point selection processing according to the third embodiment. (A) in FIG. 18 is a criterion reference point, (B) in FIG. 18 is query data and (C) in FIG. 18 is a neighborhood range U. Further, the shaded circles in FIG. 18 are registration data included in the set Y of the neighborhood data, and X marks are auxiliary reference points.

Next, the information processing device 10b searches for a set $X_q$ of auxiliary reference points which are regarded to be close to the query data q. For example, when utilizing the index using the criterion reference point, the information processing device 10b calculates the distance d ($o_i$,q) between each criterion reference point $o_i$ (i=1 to M) and the query data q, and determines whether or not the auxiliary reference point associated with $o_i$ is an auxiliary candidate of q, using the following equation (24).

$$d(o_i,q)-t<u_i^{max} \quad (24)$$

Meanwhile, "$u_i^{max}$" in equation (23) is the distance between an auxiliary reference point having the maximum distance to the reference point $o_i$, and the reference point $o_i$, among auxiliary reference points associated with the reference points $o_i$ in an auxiliary reference point index $I_{sub}$. In addition, although t is a value indicating the neighborhood range for auxiliary reference points, "t=U" may hold.

Next, the information processing device 10b searches for $N_q$ auxiliary reference points having a key value in the range of [d($o_i$,q)+i×C−t, d($o_i$,q)+i×C+t], from the auxiliary reference point index $I_{sub}$ at maximum. Further, the information processing device 10b makes the set of the searched auxiliary reference point $X_q$. In this case, the information processing device 10b searches for the auxiliary reference points indicated by the X marks in FIG. 18, that is, the auxiliary reference points included in the donut-shaped range around the corresponding criterion reference point.

In addition, when searching for a number of auxiliary reference points greater than $N_q$, the information processing device 10b selects $N_q$ auxiliary reference points, from the search auxiliary reference points at random, and makes the number of selected auxiliary reference points $N_q$.

By contrast with this, when searching for auxiliary reference points using LSH, the information processing device 10b calculates L (j=1 to L) hash values $g_j$ (q) using the query data q. Further, the information processing device 10b selects $N_q$ auxiliary reference points having the same hash value as the calculated hash value $g_j$(q) at maximum, from the hash table, and makes the set of the selected auxiliary reference points $X_q$.

Next, an example of processing of performing pruning using auxiliary reference points by the information processing device 10b will be described. First, the information processing device 10b calculates the distance d ($s_i$,q) between the auxiliary reference point {$s_i$|i∈$X_q$} and the query data q. Further, the information processing device 10b determines whether or not registration data having a distance from registration data of a neighborhood candidate to {$s_i$|i∈$X_q$} in a predetermined range satisfies the following equation (25), and excludes the registration data from neighborhood candidates when equation (25) is satisfied.

$$\{|d(s_i,q)-d(s_i,p_n)|>U|i\in X_q, X_p, n\in Y\} \quad (25)$$

Figure 19:
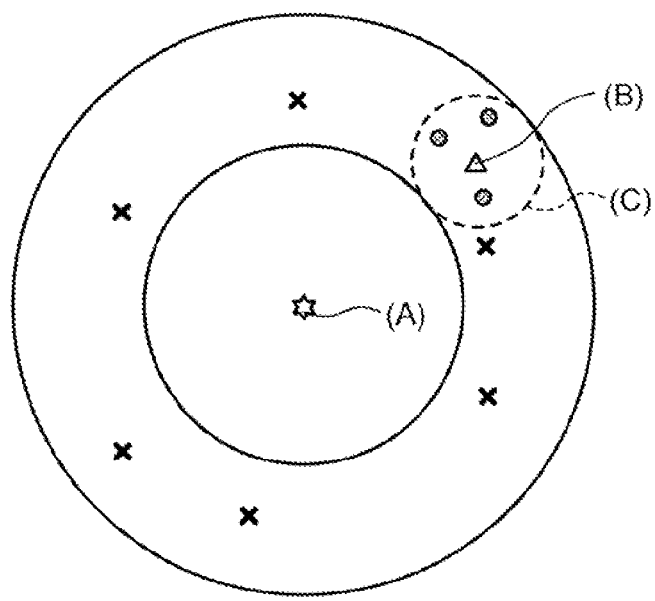
FIG. 19 is a view for describing an example of pruning using auxiliary reference points according to the third embodiment.

Meanwhile, FIG. 19 is a view for describing an example of pruning using auxiliary reference points according to the third embodiment. (A) in FIG. 19 is a corresponding criterion reference point, (B) in FIG. 19 is query data and (C) in FIG. 19 is a neighborhood range. When excluding registration data satisfying equation (24) from the neighborhood range, the information processing device 10b uses only registration data indicated by shaded circles in FIG. 19 as neighborhood candidates. As described above, if the distances between the searched auxiliary reference points and registration data which is searched as a neighborhood candidate are stored upon data registration, the information processing device 10b can easily determine that almost all items of data which are neighborhood candidates satisfy equation (25) as illustrated in FIG. 19. Consequently, the information processing device 10b can easily prune the neighborhood candidates.

Figure 20:
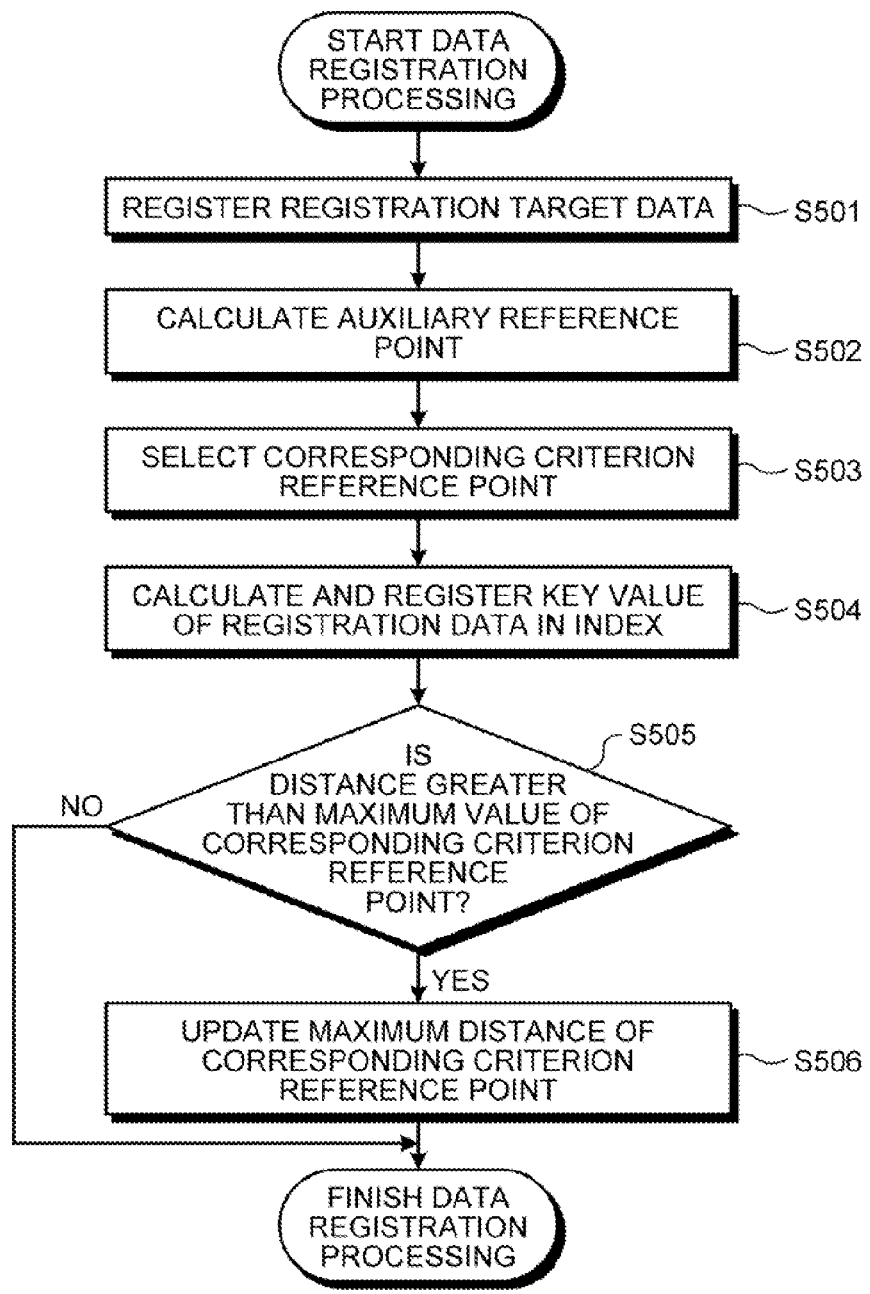
FIG. 20 is a flowchart for describing an example of a flow of registration processing according to the third embodiment.

Next, an example of a flow of processing of registering new data by the information processing device 10b will be described using FIG. 20. FIG. 20 is a flowchart for describing an example of a flow of registration processing according to the third embodiment. With the example illustrated in FIG. 14, the information processing device 10b starts processing when triggered by reception of data to be registered in the database 21b.

First, the information processing device 10b registers registration target data in the database 21b (step S501). Further, the information processing device 10b calculates an auxiliary reference point corresponding to the new registration data (step S502). Next, the information processing device 10b selects a corresponding criterion reference point (step S503).

Next, the information processing device 10b calculates a key value of the registration target data, and registers a distance between an ID of an auxiliary reference point corresponding to registration data and an auxiliary reference point, in the index (step S504). Further, the information processing device 10b determines whether or not the distance between the corresponding criterion reference point and the new registration data is greater than the maximum value of the distance associated with the corresponding criterion reference point (step S505). Further, the information processing device 10b executes the following processing when determining that the distance between the corresponding reference point and the new registration data is greater than the maximum value of the distance associated with the corresponding criterion reference point (Yes in step S505). That is, the information processing device 10b updates the maximum value of the distance associated with the corresponding criterion reference point (step S506). Then, the information processing device 10b finishes processing.

By contrast with this, the information processing device 10b finishes processing as is when determining that the distance between the corresponding reference point and the new registration data is smaller than the maximum value of the distance associated with the corresponding criterion reference point (No in step S505).

Figure 21:
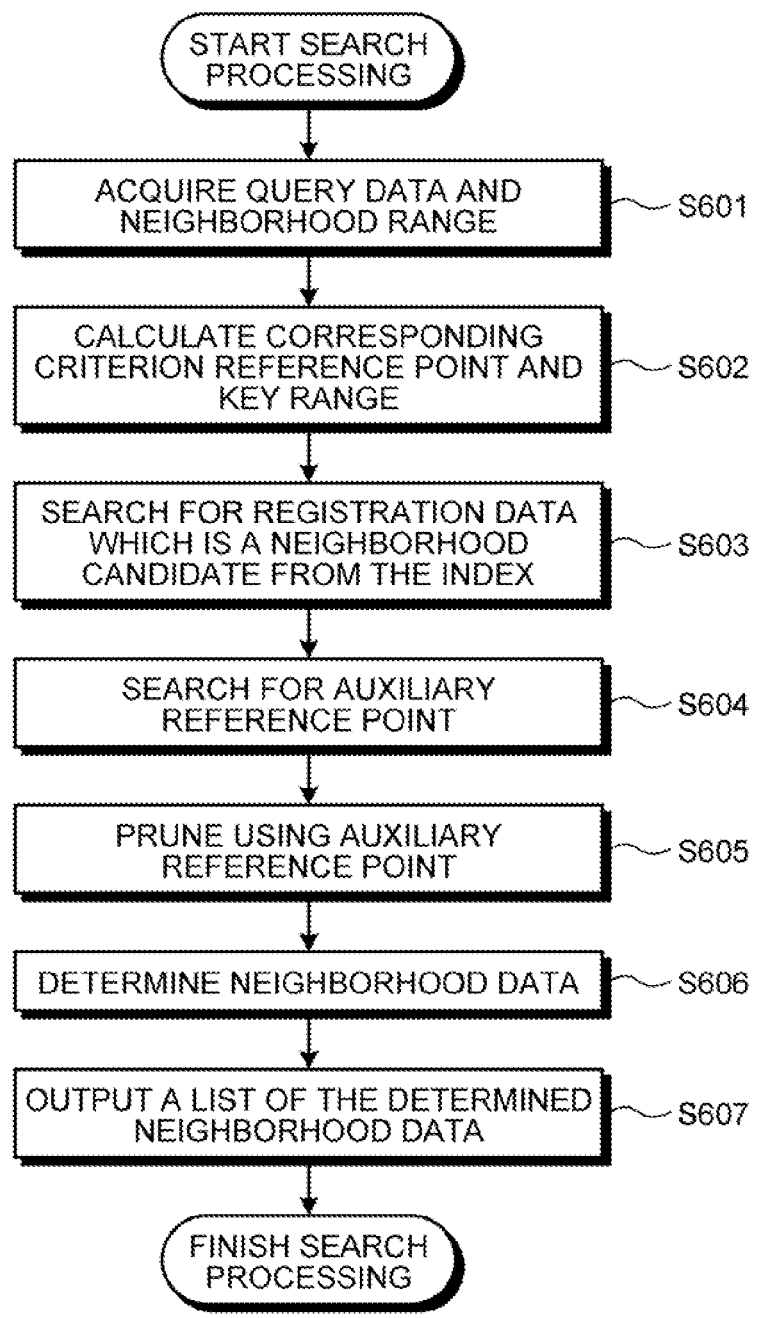
FIG. 21 is a flowchart for describing an example of a flow of search processing according to the third embodiment.
Figure 22:
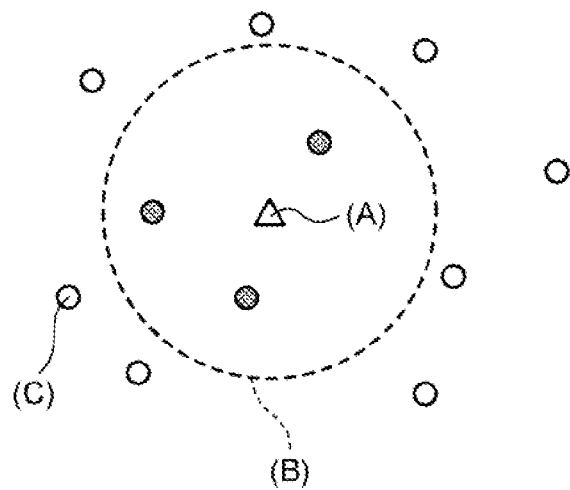
FIG. 22 is a view for describing conventional neighborhood search.
Figure 23:
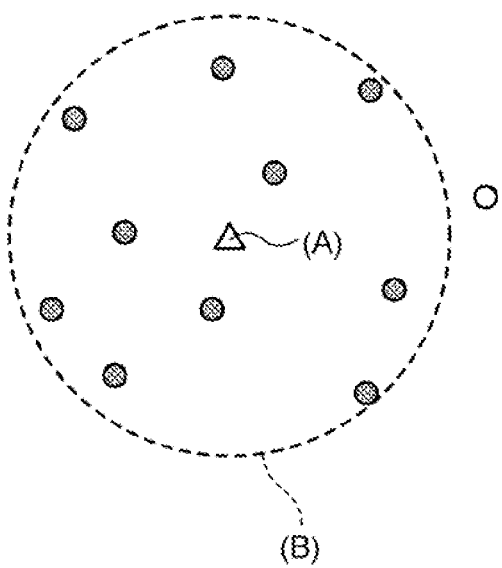
FIG. 23 is a view for describing conventional neighborhood search.

Next, an example of a flow of processing of searching for neighborhood data of input query data by the information processing device 10b will be described using FIG. 21. FIG. 21 is a flowchart for describing an example of a flow of search processing according to the third embodiment. With an example illustrated in FIG. 21, the information processing device 10b starts search processing when triggered by acquisition of query data and information indicating the neighborhood range.

First, the information processing device 10b acquires the query data and information indicating the neighborhood range (step S601). In this case, the information processing device 10b calculates corresponding criterion reference points associated with the registration data which is a neighborhood candidate of the acquired query data, and the key value range of registration data which is a neighborhood candidate (step S602). Next, the information processing device 10b searches for registration data which is a neighborhood candidate from the index, using the calculated key value range (step S603).

Next, the information processing device 10b searches for auxiliary reference points which are in the neighborhood of query data (step S604). Next, the information processing device 10a prunes neighborhood candidates, using the auxiliary points acquired from the index and the searched auxiliary reference points (step S605). Next, for each registration data included in the pruned neighborhood candidates, the information processing device 10b calculates the distance to query data, and determines neighborhood data (step S606). Then, the information processing device 10b outputs a list of the determined neighborhood data to the authentication server 3 (step S607), and finishes processing.

Effect of Third Embodiment

As described above, the information processing device 10b searches for auxiliary reference points which are in the neighborhood of registration data, using approximate neighborhood search. Further, the information processing device 10b associates and registers the registration data, the searched auxiliary reference points and distances between the searched auxiliary reference points and the registration data in the index. Further, the information processing device 10b searches for registration data which is a neighborhood candidate of query data, and prunes neighborhood candidates, using the auxiliary reference points associated with the searched registration data and the auxiliary reference points which are in the neighborhood of query data.

That is, the information processing device 10b stores in the index the distances to a plurality of auxiliary reference points which are regarded to be in the neighborhood of each registration data, and prunes neighborhood candidates using only auxiliary reference points which are regarded to be close to query data upon search processing. Hence, the information processing device 10b can reduce the memory usage compared to a case where distances to all reference points are stored.

Further, the information processing device 10b searches for an auxiliary reference point close to the query data, utilizing approximate neighborhood search and, consequently, can acquire an auxiliary reference point close to the query data at a high speed. Further, the information processing device 10b can efficiently prune neighborhood candidates by selecting an auxiliary reference point close to registration data and an auxiliary reference point close to the query data, that is, an appropriate reference point.

Further, the information processing device 10b uses approximate neighborhood search only to select an auxiliary reference point and calculates a distance between query data and registration data when neighborhood data is determined, so that strictness of a final neighborhood search result is guaranteed.

Fourth Embodiment

Although embodiments of the present invention have been described above, embodiments may be implemented in various different embodiments other than the above embodiments. Hence, another embodiment incorporated in the present invention will be described below as the fourth embodiment.

(1) Regarding Information Processing Device 10

The above information processing device 10 associates and stores each registration data and an error parameter in the database 21, and associates and registers the registration data and the error parameter also in the index. However, the embodiments are not limited to this.

That is, when performing neighborhood search taking the error parameter associated with each registration data into account, the information processing device 10 can appropriately search for registration data of significant variation. Consequently, the information processing device 10 can appropriately search for registration data of significant variation by performing linear search taking the error parameter into account without selecting a neighborhood candidate using the index.

(2) Regarding Information Processing System

With the above first to third embodiments, the information processing devices 10 to 10b included in the authentication system which performs biometric authentication have been described. However, the embodiments are not limited to this, and the information processing devices 10 to 10b can be applied to an arbitrary system which requires neighborhood search.

(3) Regarding Pruning

The above information processing devices 10a and 10b perform pruning using information registered in an index. However, the embodiments are not limited to this, and more efficient neighborhood search may be performed by additionally using a pruning method which is generally used in combination.

(4) About Rotation of Corresponding Reference Point

The above information processing device 10a rotates a corresponding reference point about the original point such that the number of registration data to be pruned is the greatest. However, this processing is not indispensable processing, and therefore may not be performed.

(5) Regarding Registration Data

Although the information processing device 10 stores biological data in the database 21 as registration data, the biological data changes biological information when times passes after data is registered, and a difference with respect to the biological data input as query data is regarded to be significant. Hence, the information processing device 10 may correct an error parameter of each registration data according to the time passes after registration data is registered.

According to one aspect, it is possible to prevent search omission.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
a memory that stores registration data of a search target and error information indicating an error of the registration data in association with each other, the memory further storing a distance between a reference point set in advance and each registration data; and a processor coupled to the memory, wherein the processor executes a process comprising:

first searching for registration data from the registration data stored by memory, the registration data searched by the first searching being registration data for which a value obtained by subtracting a value of the error information from a value of distance between query data related to a search request and the registration data is within a predetermined neighborhood range, wherein the first searching comprises:

second searching for registration data which meets the following conditions:

(a) a value of distance stored in the memory is larger than a value obtained by subtracting a value of a predetermined neighborhood range and a maximum value of the error information from a value of distance between the reference point and the query data; and (b) the value of the distance stored in the memory is smaller than a value obtained by adding the value of the predetermined neighborhood range and the maximum value of the error information to the value of distance between the reference point and the query data; and determining neighborhood data of the query data from the registration data searched by the second searching, the neighborhood data of the query data being registration data for which a value obtained by subtracting the value of the error information from the value of distance between registration data and the query data is within the neighborhood range.

2. The information processing device according to claim 1, wherein the memory stores the error information calculated using one of an average of a feature amount obtained from a plurality of items of data input when the registration data is stored, a dispersion of a feature amount of the plurality of items of data, an accuracy of a device which acquires the registration data and quality of biological data which is estimated from disposition conditions of the device which acquires the registration data.

3. An information processing device comprising:

a memory that stores registration data which is a search target, a distance between the registration data and a reference point set in advance, and an inner product of the registration data and the reference point in association with each other, and a processor coupled to the memory, wherein the processor executes a process comprising:

searching for registration data which meets the following conditions:

(a) a value of a distance stored in the memory is larger than a value obtained by subtracting a value indicating a predetermined neighborhood range from a distance between the reference point and a query data of a search request; and (b) the value of the distance stored in the memory is smaller than a value obtained by adding the value indicating the neighborhood range to the distance between the reference point and the query data;

first extracting registration data from the registration data found as a result of search by the searching, the registration data extracted by the first extracting being registration data for which a difference between the distance between the query data and the reference point and the distance between the registration data and the reference point is within the neighborhood range;

second extracting registration data from the registration data extracted by the first extracting, the registration data extracted by the second extracting being registration data for which an inner product stored in the memory is within a predetermined range with respect to an inner product of the reference point and any vector within the neighborhood range of the query data; and determining neighborhood data of the query data from the registration data extracted by the second extracting, the neighborhood data of the query data being registration data for which the distance to the query data is within the neighborhood range.

4. The information processing device according to claim 3, wherein the second extracting extracts registration data for which the inner product value stored in the memory is within an inner product value of a reference point obtained by rotating the reference point parallel to a plane including the query data and the registration data and an arbitrary vector which is within a neighborhood range of the query data.

5. The information processing device according to claim 4, wherein the memory stores the reference point being set at a position for which the difference between distances from two items of arbitrary registration data maximizes.

6. The information processing device according to claim 4, wherein the memory stores the reference point being set at a position for which the difference of inner products of two items of arbitrary registration data maximizes.

7. An information processing device comprising:

a memory; and a processor coupled to the memory, wherein the processor executes a process comprising:

first selecting a criterion reference point from a plurality of criterion reference points set in advance, the criterion reference point selected by the first selecting is closest to registration data of a search target;

second selecting an auxiliary reference point from a plurality of auxiliary reference points set in advance, the auxiliary reference point selected by the second selecting is within a predetermined neighborhood range of the registration data;

storing the registration data, a value of distance between the registration data and the criterion reference point selected by the first selecting, and a value of distance between the registration data and the auxiliary reference point selected by the second selecting in the memory;

third selecting an auxiliary reference point within the neighborhood range of query data of a search request;

searching for registration data which meets the following conditions:

(a) a value of the distance stored in the memory is larger than a value obtained by subtracting a value of the neighborhood range from a value of distance between the query data and the criterion reference point; and (b) the value of the distance stored in the memory is smaller than a value obtained by adding the value of the neighborhood range to the value of distance between the query data and the criterion reference point;

extracting registration data from the registration data found as a result of search by the searching, the registration data extracted by the extracting being registration data for which a difference is within a value of the neighborhood range, the difference is a difference between the value of distance between the auxiliary reference point and the query data, and a value of distance between the auxiliary reference point and the registration data; and determining neighborhood data of the query data from the registration data extracted by the extracting, the neighborhood data of the query data being registration data for which the distance to the query data is within the neighborhood range.

8. The information processing device according to claim 7, wherein:

the memory further stores a distance between the auxiliary reference point and the criterion reference point;

the second selecting selects the auxiliary reference point which meets the following conditions:
  (a) a value of the distance from the criterion reference point is larger than a value obtained by subtracting a value of the neighborhood range from a value of distance between the registration data and the criterion reference point; and
  (b) the value of the distance stored in the memory is smaller than a value obtained by adding the value of the neighborhood range to the value of distance between the registration data and the criterion reference point; and the third selecting selects the registration data which meets the following conditions:
  (a) a value of distance from the criterion reference point is larger than a value obtained by subtracting a value of the neighborhood range from the value of distance between the query data and the criterion reference point; and
  (b) a value of distance from the criterion reference point is smaller than a value obtained by adding the value of the neighborhood range to the value of distance between the query data and the criterion reference point.

9. The information processing device according to claim 7, wherein:

the memory further stores a hash value of each auxiliary reference point;

the second selecting selects an auxiliary reference point which has a hash value matching with a hash value of the registration data; and the third selecting selects an auxiliary reference point which has a hash value matching with a hash value of the query data.

10. An information processing system comprising:

a generating device which generates query data related to a search request; and an information processing device which, when acquiring query data generated by the generating device, searches for registration data similar to the query data, from registration data of a search target, wherein the information processing device comprises:
  a memory that stores registration data and error information indicating an error of the registration data in association with each other, the memory further storing a distance between a reference point set in advance and each registration data; and
  a processor coupled to the memory, wherein the processor executes a process comprising:
    first searching for registration data from the registration data stored by memory, the registration data searched by the first searching being registration data for which a value obtained by subtracting a value of the error information from a value of distance between query data related to a search request and the registration data is within a predetermined neighborhood range, wherein
    the first searching comprises:
      second searching for registration data which meets the following conditions:
        (a) a value of distance stored in the memory is larger than a value obtained by subtracting a value of a predetermined neighborhood range and a maximum value of the error information from a value of distance between the reference point and the query data;
        (b) the value of the distance stored in the memory is smaller than a value obtained by adding the value of the predetermined neighborhood range and the maximum value of the error information to the value of distance between the reference point and the query data; and
      determining neighborhood data of the query data from the registration data searched by the second searching, the neighborhood data of the query data being registration data for which a value obtained by subtracting the value of the error information from the value of distance between registration data and the query data is within the neighborhood range.

11. An information processing system comprising:

a generating device which generates query data related to a search request; and an information processing device which, when acquiring query data generated by the generating device, searches for registration data similar to the query data, from registration data of a search target, wherein:

the information processing device comprises:
  a memory that stores registration data, a distance between the registration data and a reference point set in advance, and an inner product of the registration data and the reference point in association with each other;
  a processor coupled to the memory, wherein the processor executes a process comprising:
    searching for registration data which meets the following conditions:
      (a) a value of a distance stored in the memory is larger than a value obtained by subtracting a value indicating a predetermined neighborhood range from a distance between the reference point and the query data; and
      (b) the value of the distance stored in the memory is smaller than a value obtained by adding the value indicating the neighborhood range to the distance between the reference point and the query data;
    first extracting registration data from the registration data found as a result of search by the searching, the registration data extracted by the first extracting being registration data for which a difference between the distance between the query data and the reference point and the distance between the registration data and the reference point is within the neighborhood range;

second extracting registration data from the registration data extracted by the first extracting, the registration data extracted by the second extracting being registration data for which an inner product stored in the memory is within a predetermined range with respect to an inner product of the reference point and any vector within the neighborhood range of the query data; and determining neighborhood data of the query data from the registration data extracted by the second extracting, the neighborhood data of the query data being registration data for which the distance to the query data is within the neighborhood range.

12. An information processing system comprising:

a generating device which generates query data related to a search request; and an information processing device which, when acquiring query data generated by the generating device, searches for registration data similar to the query data, from registration data of a search target, wherein:

the information processing device comprises:

a memory; and a processor coupled to the memory, wherein the processor executes a process comprising:

first selecting a criterion reference point from a plurality of criterion reference points set in advance, the criterion reference point selected by the first selecting is closest to registration data of a search target;

second selecting an auxiliary reference point from a plurality of auxiliary reference points set in advance, the auxiliary reference point selected by the second selecting is within a predetermined neighborhood range of the registration data;

storing the registration data, a value of distance between the registration data and the criterion reference point selected by the first selecting, and a value of distance between the registration data and the auxiliary reference point selected by the second selecting in the memory;

third selecting an auxiliary reference point within the neighborhood range of query data of a search request;

searching for registration data which meets the following conditions:
(a) a value of the distance stored in the memory is larger than a value obtained by subtracting a value of the neighborhood range from a value of distance between the query data and the criterion reference point; and
(b) the value of the distance stored in the memory is smaller than a value obtained by adding the value of the neighborhood range to the value of distance between the query data and the criterion reference point;

extracting registration data from the registration data found as a result of search by the searching, the registration data extracted by the extracting being registration data for which a difference is within a value of the neighborhood range, the difference is a difference between the value of distance between the auxiliary reference point and the query data, and a value of distance between the auxiliary reference point and the registration data; and determining neighborhood data of the query data from the registration data extracted by the extracting, the neighborhood data of the query data being registration data for which the distance to the query data is within the neighborhood range.

13. A search method executed by an information processing device which searches for registration data which is similar to query data related to a search request, from registration data of a search target, the search method comprising:

storing registration data and error information indicating an error of the registration data in association with each other;

storing a distance between a reference point set in advance and each registration data;

first searching for registration data from the registration data stored by storing, the registration data searched by the first searching being registration data for which a value obtained by subtracting a value of the error information from a value of distance between query data related to a search request and the registration data is within a predetermined neighborhood range, wherein the first searching comprises:

second searching for registration data which meets the following conditions:
(a) a value of distance stored in a memory is larger than a value obtained by subtracting a value of a predetermined neighborhood range and a maximum value of the error information from a value of distance between the reference point and the query data; and
(b) the value of the distance stored in the memory is smaller than a value obtained by adding the value of the predetermined neighborhood range and the maximum value of the error information to the value of distance between the reference point and the query data; and determining neighborhood data of the query data from the registration data searched by the second searching, the neighborhood data of the query data being registration data for which a value obtained by subtracting the value of the error information from the value of distance between registration data and the query data is within the neighborhood range.

14. A search method executed by an information processing device which searches for registration data which is similar to query data related to a search request, from registration data of a search target, the search method comprising:

storing registration data, a distance between the registration data and a reference point set in advance, and an inner product of the registration data and the reference point in association with each other, searching for registration data which meets the following conditions:
(a) a value of a distance stored in a memory is larger than a value obtained by subtracting a value indicating a predetermined neighborhood range from a distance between the reference point and the query data of a search request; and
(b) the value of the distance stored in the memory is smaller than a value obtained by adding the value indicating the neighborhood range to the distance between the reference point and the query data;

extracting registration data from the registration data found as a result of search by the searching, the registration data extracted by the extracting being registration data for which a difference between the distance between the query data and the reference point and the distance between the registration data and the reference point is within the neighborhood range, and extracting registration data from the registration data extracted, the registration data extracted being registration data for which an inner product stored in the memory is within a predetermined range with respect to an inner product of the reference point and any vector within the neighborhood range of the query data; and determining neighborhood data of the query data from the registration data extracted by the extracting, the neighborhood data of the query data being registration data for which the distance to the query data is within the neighborhood range.

15. A search method comprising:

selecting a criterion reference point from a plurality of criterion reference points set in advance, the criterion reference point selected by selecting is closest to registration data of a search target, and selecting an auxiliary reference point from a plurality of auxiliary reference points set in advance, the auxiliary reference point selected by selecting is within a predetermined neighborhood range of the registration data;

storing the registration data, a value of distance between the registration data and the criterion reference point selected by selecting, and a value of distance between the registration data and the auxiliary reference point selected by selecting;

choosing an auxiliary reference point within the neighborhood range of query data of a search request;

searching for registration data which meets the following conditions:
   (a) a value of the distance stored in a memory is larger than a value obtained by subtracting a value of the neighborhood range from a value of distance between the query data and the criterion reference point; and
   (b) the value of the distance stored in the memory is smaller than a value obtained by adding the value of the neighborhood range to the value of distance between the query data and the criterion reference point;

extracting registration data from the registration data found as a result of searching, the registration data extracted by the extracting being registration data for which a difference is within a value of the neighborhood range, the difference is a difference between the value of distance between the auxiliary reference point and the query data, and a value of distance between the auxiliary reference point and the registration data; and determining neighborhood data of the query data from the registration data extracted by the extracting, the neighborhood data of the query data being registration data for which the distance to the query data is within the neighborhood range.

* * * * *